(12) United States Patent
Allen-Rouman et al.

(10) Patent No.: US 7,184,980 B2
(45) Date of Patent: Feb. 27, 2007

(54) ONLINE INCREMENTAL PAYMENT METHOD

(75) Inventors: Terry Allen-Rouman, South San Francisco, CA (US); John Joseph Mascavage, III, San Mateo, CA (US); Margaret Morgan Weichert, San Carlos, CA (US); Robert Edwin Dravenstott, San Mateo, CA (US)

(73) Assignees: First Data Corporation, Greenwood Village, CO (US); The Western Union Company, Englewood, CO (US)

( * ) Notice: Subject to any disclaimer, the term of this patent is extended or adjusted under 35 U.S.C. 154(b) by 680 days.

(21) Appl. No.: 09/991,364

(22) Filed: Nov. 15, 2001

(65) Prior Publication Data

US 2003/0093367 A1    May 15, 2003

(51) Int. Cl.
*G06F 17/60* (2006.01)

(52) U.S. Cl. .............................. 705/35; 705/39; 705/44

(58) Field of Classification Search ...................... None
See application file for complete search history.

(56) References Cited

U.S. PATENT DOCUMENTS

| | | | | |
|---|---|---|---|---|
| 4,678,895 | A | * | 7/1987 | Tateisi et al. ............... 235/379 |
| 5,383,113 | A | * | 1/1995 | Kight et al. ................. 705/40 |
| 5,453,601 | A | * | 9/1995 | Rosen ......................... 705/65 |
| 5,649,116 | A | * | 7/1997 | McCoy et al. ................ 705/38 |
| 5,699,528 | A | | 12/1997 | Hogan |
| 5,757,917 | A | | 5/1998 | Rose et al. |
| 5,802,497 | A | * | 9/1998 | Manasse ...................... 705/27 |
| 5,825,881 | A | | 10/1998 | Colvin, Sr. |
| 5,826,241 | A | | 10/1998 | Stein et al. |
| 5,899,980 | A | | 5/1999 | Wilf et al. |
| 5,903,721 | A | | 5/1999 | Sixtus |
| 5,920,847 | A | | 7/1999 | Kolling et al. |
| 5,987,132 | A | | 11/1999 | Rowney |
| 5,987,140 | A | | 11/1999 | Rowney et al. |
| 5,987,429 | A | | 11/1999 | Maritzen et al. |

(Continued)

FOREIGN PATENT DOCUMENTS

| | | |
|---|---|---|
| EP | 1 077 436 A2 | 2/2001 |
| WO | WO 99/66436 A1 | 12/1999 |
| WO | WO 00/22559 A1 | 4/2000 |
| WO | WO 00/46725 A1 | 8/2000 |
| WO | WO 00/79452 A2 | 12/2000 |
| WO | WO 02/05195 A1 | 1/2002 |

OTHER PUBLICATIONS

"New Treasury Innovations Brought to Virginia County," Corporate EFT Report, Dec. 22, 1999, vol. 19, Iss. 25, p. 1,(aka Corporate EFT Report).*

(Continued)

*Primary Examiner*—Vincent Millin
*Assistant Examiner*—Debra Charles
(74) *Attorney, Agent, or Firm*—Townsend and Townsend and Crew LLP

(57) ABSTRACT

According to the invention, a process for transferring funds between a payor and a payee in an online transaction is disclosed. In one step, information is received from the payor for debiting a bank account associated with the payor. Authorization is transmitted to the payee to request debits from the payor. The total of all debit requests does not exceed an amount that is authorized. A first request is received from the payee to debit the customer a first portion of the amount. A first debit is initiated from the bank account for the first portion of the amount. A second request is received from the payee to debit the payor a second portion of the amount. A second debit is initiated from the bank account for the second portion of the amount.

20 Claims, 17 Drawing Sheets

U.S. PATENT DOCUMENTS

| | | | |
|---|---|---|---|
| 5,991,750 A | | 11/1999 | Watson |
| 5,999,625 A | | 12/1999 | Bellare et al. |
| 6,012,048 A | | 1/2000 | Gustin et al. |
| 6,029,150 A | | 2/2000 | Kravitz |
| 6,070,798 A | | 6/2000 | Netherly |
| 6,098,053 A | | 8/2000 | Slater |
| 6,122,624 A | | 9/2000 | Tetro et al. |
| 6,122,625 A | | 9/2000 | Rosen |
| 6,246,996 B1 | | 6/2001 | Stein et al. |
| 6,393,412 B1 | * | 5/2002 | Deep .................... 705/400 |
| 6,609,113 B1 | | 8/2003 | O'Leary et al. |
| 2002/0087465 A1 | * | 7/2002 | Ganesan et al. ............ 705/39 |
| 2002/0169712 A1 | * | 11/2002 | Ginzboorg et al. .......... 705/39 |

OTHER PUBLICATIONS

"Mahwah, N.J., Telecommunications Firm Uses Electronic Payment System," Record, Hackensack, N.J., Jul. 9, 1999(aka Record).*

Intell-A-Check Corp., *Intell-A-Check!—The Way to Get Paid,* Intell-A-check Product Overview, downloaded from website http://www.icheck.com/ on Feb. 7, 2000.

Amerinet, Inc., *Debit-It!—The Best Idea In Payment Systems, Making Electronic Debit Simple,* downloaded from website http://www.debit-it.com/ on Feb. 7, 2000.

Telecheck International, Inc., *TeleCheck Verification Services,* downloaded from website http://www.telecheck.com/ on Feb. 7, 2000.

Telecheck International, Inc., *Making Checks Our Responsibility,* downloaded from website http://www.telecheck.com/ on Feb. 7, 2000.

Confinity, Inc., PayPal.com, How PayPal.com Works, downloaded from website http://www.paypal.com/ on Feb. 7, 2000.

Idealab Company, PayMe.com, downloaded from website https://ssl.idealab.com/ on Feb. 16, 2000.

TRANSPOINT, *The Way to Pay Online,* downloaded from website http://www.transpoint.com/ on Feb. 10, 2000.

X.COM, *Do More with Your Money,* downloaded from website http://www.x.com.

DOTBANK, *The Way to Send and receive Money on the Internet,* downloaded from website http://www.dotbank.com.

* cited by examiner

ONLINE INCREMENTAL PAYMENT METHOD

BACKGROUND OF THE INVENTION

The present invention relates to an electronic purchase method. Particularly, the present invention is directed to making an online purchase.

The development of the Internet has created vast new markets and marketplaces. A consumer with an Internet connection may search for, and likely find, a wide variety of goods and services. While e-commerce flourishes, though, consumers are becoming more and more wary of the apparent free flow of sensitive personal, financial and other information that takes place over the Internet, especially incident to electronic purchasing. This concern is exacerbated by the limited amount of payment options available for electronic purchasing.

Consumer Internet payments, currently estimated well into the billions of dollars, are dominated by credit cards. Online credit card acceptance is a lucrative business for banks and other payment enablers, who typically charge merchants a "discount rate" of between 2–5% of the value of each transaction, in addition to a variety of other fees. Discount fees paid by online merchants are a significant source of business to credit card companies, and that business will continue to grow at an ever faster rate as online commerce continues to explode.

Although widespread, credit cards have significant limitations for merchants, consumers and small businesses. Merchant discount rates on the Internet are typically far higher than in the physical world. Moreover, those discount rates continue to rise. Further, online merchants are also exposed to high fraud costs and "chargeback fees," bearing liability because there is no credit card signature with an online sale.

The dominance of credit cards also shrinks the market for online merchants and consumers. As the online population becomes more mainstream, millions of adults and teenagers without credit cards are left out of online shopping. In addition, most small business employees do not have small business credit cards. Credit cards are also inconvenient or illegal for some businesses. For example, legal and regulatory restrictions prevent insurance brokers, mortgage brokers and money managers from accepting many types of payments via credit cards. Furthermore, despite the dominance of credit cards on the Internet, in the overall economy, physical paper checks are still an attractive way for most people to pay for point-of-sale purchases; this attraction is particularly pronounced among certain populations of consumers (e.g. adults over 50) and in certain merchant categories (e.g. grocery stores).

Online retailers that accept credit cards routinely charge for an order incrementally. For example, part of the charge is presented to the credit card company when a first part of an order ships. Remaining portions are charged as other parts of the order ship. Partial charges are common where part of an order is out-of-stock.

Internet auctions, a particularly fast-growing segment of the Internet commerce community, are ill-adapted for credit card purchasing. Most transactions initiated through an auction site are paid for via a personal check or money order. Each of these methods has major limitations and friction for consumers: personal checks sent through the mail are slow, do not come with a guarantee, and provide bank account information to an unknown person. By contrast, money orders, while providing a payment guarantee for sellers, are inconvenient for buyers who must buy them in the physical world and pay a fee for them. The challenges and limitations of existing Internet payment methods have led to a variety of systems and methods with a host of different solutions. These systems, however, have focused on solving either the Internet payment challenges of merchants or the payment challenges of consumers. To date, there is no system or method for making an electronic purchase that overcomes the significant obstacles of the credit card and provides a useful alternative to both merchants and consumers.

One popular system that avoids some of the problems associated with the credit card is use of a debit card. Despite increased adoption and usage of debit card payments in the physical world, however, debit cards have not been particularly successful on the Internet for a variety of reasons. The debit cards that are being used on the Internet are "offline" debit cards. "Offline" debit cards work like credit cards, without the use of a personal identification number (PIN). Unlike debit transactions using a PIN, these transactions are processed through the credit card networks, resulting in a "delayed debit," where payment is deducted 2–3 days after the transaction occurs. The "delayed debit" feature exposes banks to credit risk, and as a result, "offline" debit cards are usually only issued to individuals who already have credit cards, leaving millions of consumers without a debit vehicle for purchasing online. In addition, merchants have to pay a discount rate that is almost as high as credit card rates. Debit cards also are problematic for consumers, because many debit cards have daily volume limits that make them impractical for transactions over a particular amount. Moreover, debit cards do not have the same level of fraud protection for consumers, since they are not covered by Consumer Credit Protection Act Regulation Z. Finally, debit cards are not generally suitable for business to business transactions.

Since "online" or PIN-based debit has become so popular in the physical world, several initiatives are underway to bring PIN-based debit to the Internet. Today it is not possible to use a basic ATM card number in order to pay on the Internet. First, the information needed to process ATM card transactions, including the necessary routing information, are contained in a magnetic strip on the card. Second, a consumer's PIN requires both consumers and merchants to have access to PIN-pad technology. Existing technology does not allow for magnetic strip and PIN dependent transactions to be conducted on line. Moreover, such a system would require transmission of a consumer's closely guarded PIN over the Internet.

Other methods for electronic purchasing which have been developed by banks or check verification companies, fall into two primary categories: 1) smart-card based solutions and 2) check printing solutions. The smart card solutions are highly secure, but cumbersome, requiring consumers to have a smart card reader and smart card to pass a digital signature along with checking account information. The check printing solutions are easy for consumers, but far less secure, and require merchants to buy special check printing equipment and proprietary checks to print out (and then deposit) physical paper facsimiles of the consumer check.

Other methods for facilitating electronic payment without the use of credit cards have relied on transferring funds from a purchaser's bank account to a merchant. The prior systems and methods, however, have been unsatisfactory for a number of reasons. Most require the purchaser to communicate his or her personal financial information (including banks and account numbers) directly to the merchant each time a purchase is made, who then requests payment from a check processor. The check processor then handles the transfer of funds by creating a physical, printed check drawn on the purchaser's account, or electronically transferring funds to the merchant. Other electronic funds transfer methods require e-mail notifications to the funds recipient for every transaction. Such methods are not suitable for consumer-to-business or business-to-business use, which may include hundreds or thousands of transactions each day. Other methods require each user to have a separate account that deals specifically with a "quasi-currency", such as credits, discounts, mileage or unique "dollars" specific to the service provider, that must be converted to regular funds for each transaction. Others still require a user to own a credit card to be eligible for the service, even if funds are transferred from a separate bank account.

BRIEF DESCRIPTION OF THE DRAWINGS

The present invention is described in conjunction with the appended figures.

Figure 1A:
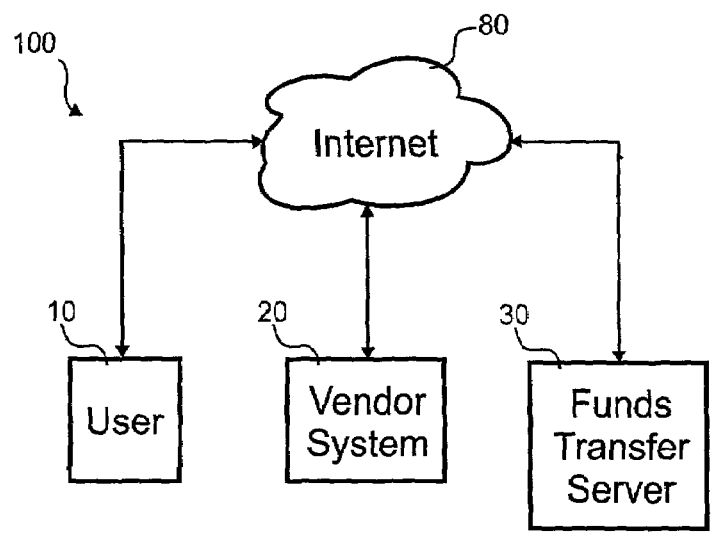
FIG. 1A is a block diagram of an embodiment of a electronic transfer system.

In the appended figures, similar components and/or features may have the same reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

The present invention provides an electronic payment method for incrementally transferring funds between a payor and a payee in an online transaction. The payor configures a funds transfer server for debiting a bank account associated with the payee. Authorization is transmitted by the payee to the funds transfer server to request debits from the payor in the form of a digital IOU. The funds transfer server checks that the total of all debit requests does not exceed an amount that is authorized. The payee can request debits until the digital IOU is fully redeemed.

Further, the present invention provides an electronic payment method wherein the transaction is approved or denied in real time. A feature of an embodiment of the present invention is a FTS that authorizes or denies an electronic purchase at the time of the purchase request. In one embodiment, both the purchaser and vendor may proceed with the transaction and maintain the privacy of the parties involved.

The present invention also provides a method of purchasing from a vendor that does not necessarily require ownership of a credit card. A feature of an embodiment of the present invention is a funds transfer server that securely accesses a purchaser's bank account. Yet another feature of an embodiment of the invention is a funds transfer server that debits or credits a party's credit card account if the party so chooses. Yet another embodiment of the present invention is a funds transfer server that transfers "quasi-currency." Yet another feature of an embodiment of the present invention is the use of an automated clearing house to transfer funds electronically from a purchaser to a vendor through a funds transfer server. In one embodiment, virtually any person or entity with a bank account, credit card account or "quasi-currency" plan may utilize the present payment system.

The present invention allows a purchaser to transfer funds from an account to a vendor without providing sensitive account information to the vendor. A feature of an embodiment of the present invention is a separate funds transfer server that validates the purchaser. Another feature of an embodiment of the present invention is that the funds transfer server, and not the vendor, accesses the purchaser's account. Another feature of an embodiment of the present invention is that account information need only be provided once to the funds transfer server. Another feature of an embodiment of the present invention is that account information is only provided to the funds transfer server. Another feature of an embodiment of the present invention is that a purchaser may register with the funds transfer server on line, via phone, via fax, on site or via regular mail.

Further, the present invention provides a system for making electronic purchases suitable for all types of transactions. A feature of an embodiment of the present invention is to provide a funds transfer server with purchaser account information. Another feature of an embodiment of the present invention is to provide the funds transfer server with merchant account information. Another feature of an embodiment of the present invention is to provide a merchant with digital IOU's that may be redeemed at a later time. A feature of an embodiment of the present invention is that funds may be transferred through an automated clearing house from one account to another, regardless of the owner. Another feature of an embodiment of the present invention is that the transaction may occur in real time. Another feature of an embodiment of the present invention is that the digital IOU's can be redeemed by transferring funds from a purchaser account to a merchant account through a funds transfer server. The redeeming step may further include use of an automated clearing house. In various embodiments, no e-mail notification is required for real time transactions, and a merchant may redeem multiple digital IOU's all at once. The present invention is suitable for consumer-to-consumer, business-to-business or consumer-to-business transactions.

The methods and systems presented herein may be used for transferring funds from a payor to a payee without either party having access to the other's financial information. The present invention is particularly suited for electronic funds transfers, such as consumer-to-business e-commerce transactions. However, the present system applies equally well to business-to-business or consumer-to-consumer transactions and is intended to cover such transactions within its scope. For purpose of explanation and illustration, and not limitation, an exemplary embodiment of the system and methods in accordance with the invention is shown in FIGS. 1A–C.

Figure 1B:
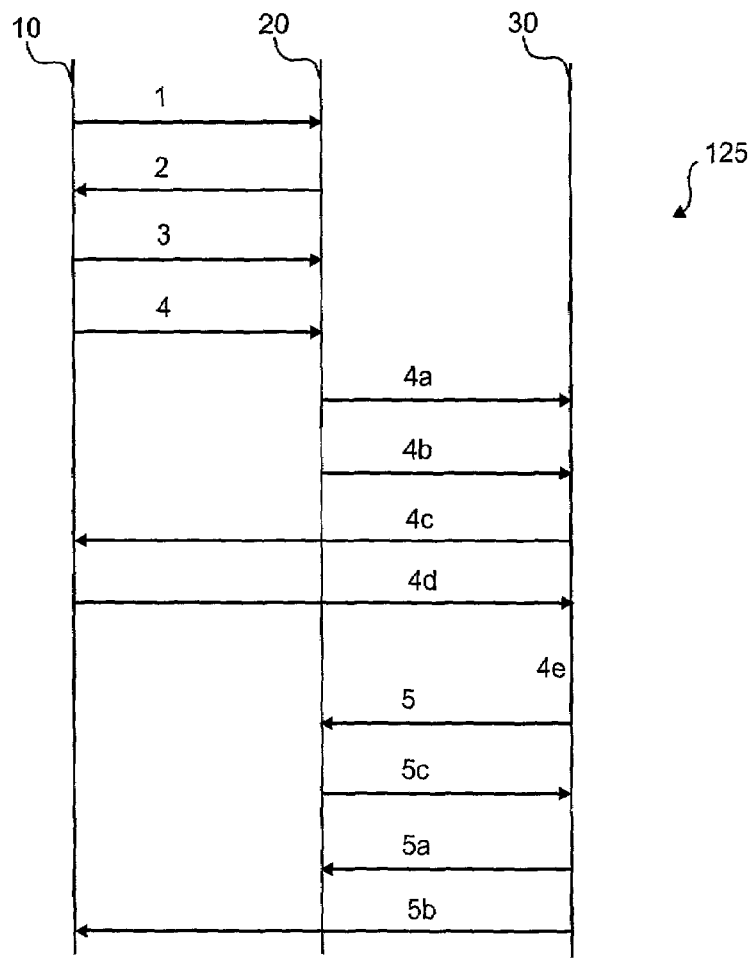
FIG. 1B is a schematic representation of an embodiment of a consumer-to-business transaction in accordance with the present invention.
Figure 1C:
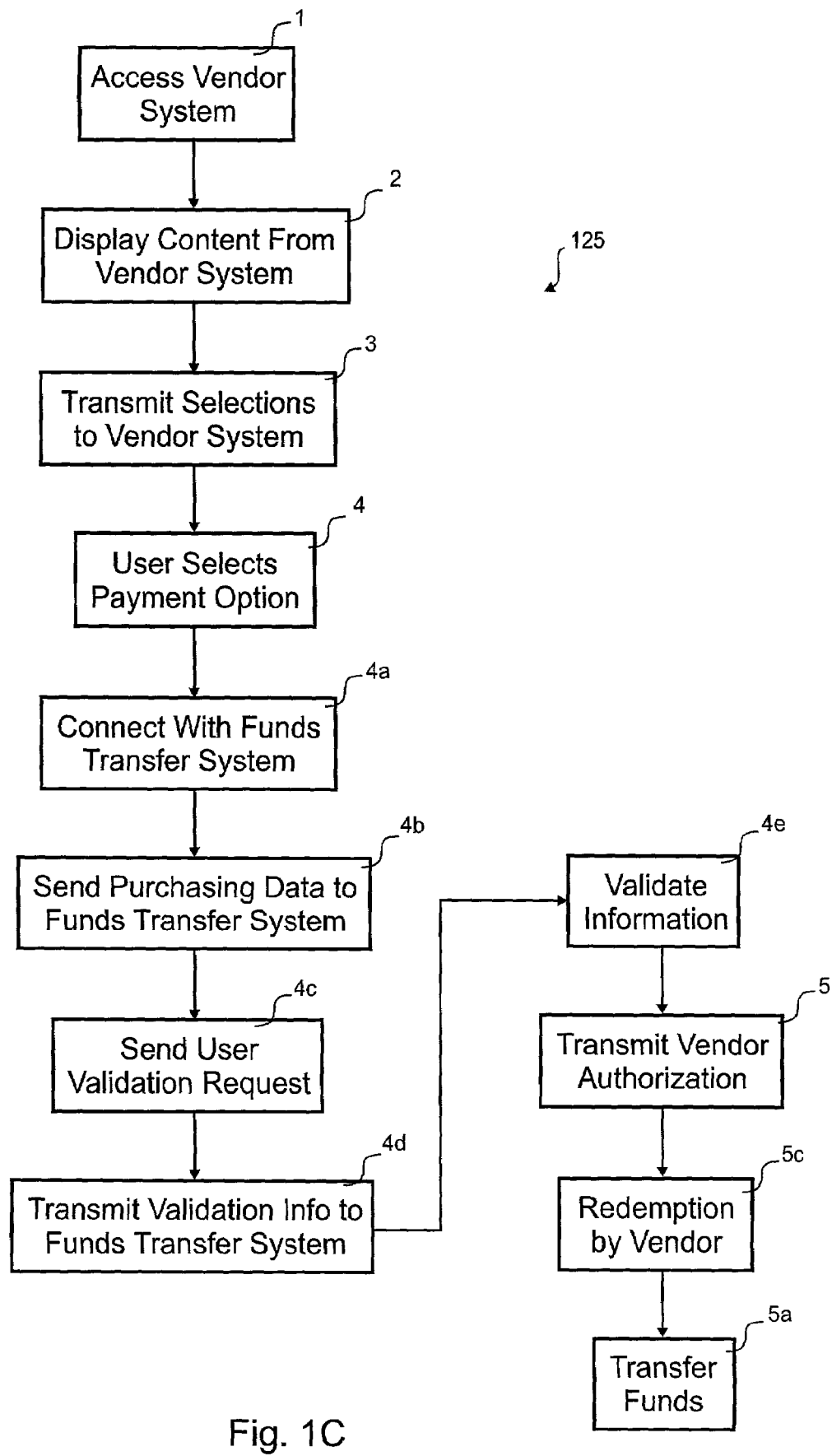
FIG. 1C is a flow diagram of the embodiment of a consumer-to-business transaction shown in FIG. 1B.

FIGS. 1B and 1C depict the steps of one embodiment of the present invention in the context of a consumer-to-business transaction. The method involves a user 10, vendor system 20, and funds transfer server 30 interconnected over a network which are shown in the depiction of a electronic transfer system 100 in FIG. 1A. In one embodiment, the user 10 will access the network using a personal computer having a network connection. Such network connections may include, without limitation, any combination of modems, cable modems, wireless connections, digital subscriber lines, telephone lines, television cable lines having Internet connectivity, or other suitable network connections. In addition, the user 10 may access the network using any kind of apparatus suitable for transmitting and receiving information over a network, such as, without limitation, personal computers, handheld devices (such as wireless or modem adaptable personal data apparatuses), telephones, pagers, mobile phones or other apparatuses that may be connected, either via modem or wireless, to a network, including consoles such as may be found at a check-out area on site at a merchant store.

In the one embodiment, the network 80 is the Internet or other wide area network. However, it should be apparent from the present description of the invention that any interconnection of interfaces capable of sending and receiving information will be considered a network for purposes of the present invention. Other networks may include, without limitation, telephone networks, wireless digital networks, serial cable networks, ATM or credit card networks, or other private networks and collections of networks including intranets, local area networks, wide area networks and the Internet.

Similarly, the vendor system 20 and funds transfer server 30 may be any system or apparatus capable of receiving or transmitting information in accordance with the present invention.

In a first embodiment 125 of the invention, a user 10 accesses 1 a vendor system 20 over a network. There are numerous ways in which a user 10 may access 1 the vendor system 20. One way to access 1 the vendor system 20 is through an Internet browser on the user's 10 computer. For example, once the user 10 has established a connection to the network, the user 10 may enter the Universal Resource Locator (URL) of the vendor system 20 into a browser, which will then connect to the vendor system 20 and display 2 the content of the vendor system 20 on the user's terminal.

In the this embodiment, the vendor system 20 will transmit information about goods or services offered by the vendor which the user 10 may view for purchase decision making. In another embodiment of the present invention, the electronic transaction may occur at a check-out line in a physical merchant store. In that embodiment, the steps of the present method would occur at that check-out line. For example, the step for accessing 1 the vendor system 20 may be initiated by a cashier at a cash register terminal, as is known in the art. Alternatively, check-out areas with terminals may be dispersed throughout a merchant store to allow the user 10 to purchase an item without the use of a check-out line or cashier.

If the user 10 so desires, the user 10 may choose to purchase goods or services from the vendor. Once the user 10 makes a purchase selection, such selection is transmitted 3 to the vendor system 20. Such transmission may take a variety of forms and will be determined in large part by the particular look and feel of the vendor system 20. For example, the user 10 may simply click on an item in the browser. Alternatively, the user 10 may drag and drop icons to indicate a desire to make a purchase. The user 10 may also be required to enter particular data, such as by typing, to identify the goods or services to be bought. In other embodiments, such as the on-site transaction, the step for transmitting a purchase selection 3 may include, without limitation, scanning a particular item or entering an item code, such as a stock keeping unit (SKU) number or bar code, into the vendor system 20.

Once a purchase selection has been transmitted 3 to the vendor system 20, the user will typically select 4 one of a variety of available payment options. The selection 4 may be accomplished in a number of ways, including without limitation, selecting from drop down, pop-up or side slide menus, entering text or data, clicking on a link or icon. The step for selection 4 may also be accomplished automatically by the vendor system 20 in accordance with a known user 10 preference which may have been communicated to the vendor system 20 at a previous time, and such selection is intended to be within the scope of the present invention. Alternative embodiments include communicating to an on-site merchant of the desire to use the present method, as may be done, for example, orally or by entering a code, such as user name or password, on a console at the check-out line. Some embodiments may allow the vendor to specify which payment sources are accepted. The payment sources configured by the user could be culled by the sources accepted by a particular vendor such that the culled sources are presented to the user when choosing the payment source for a transfer.

In accordance with this embodiment, the payment option comprises several steps that permit transfer of personal information of the user 10, such as sensitive financial information including bank identifications, names and addresses, social security numbers, dates of birth, phone numbers, drivers license numbers, account numbers, routing numbers, account balances and other financial data, to a funds transfer server 30 without exposure to the vendor system 20. Accordingly, the payment option comprises connecting 4a to a funds transfer server 30 separate from the vendor system 20. The step for connecting 4a may be accomplished immediately once the specific payment option is selected. Alternatively, a user 10 may be required to click through to a separate web page hosted by the funds transfer server 30. The payment option of the present method further comprises sending 4b purchase data to the funds transfer server 30. In one embodiment in which the transaction occurs over the Internet through a web browser, the connection 4a and sending of purchase information 4b may be accomplished in one step. For example, the vendor system 20 may generate a Hypertext Transfer Protocol (HTTP) redirect to the user's 10 browser that contains the purchase information in a query string, along with a specified URL that returns the user 10 to the vendor system 30 after authorization. In addition, the vendor system 20 may generate a digital signature to accompany the purchase data to the funds transfer server 30 via a secure SSL connection. For example, the vendor system 20 may transmit an amount, a unique merchant identifier, and the type of authorization requested. The purchase data, including the digital signature, may be stored at the funds transfer server 30 to compare it with a request for payment from the vendor system 20 submitted at a later time. All such methods are intended to be within the scope of the present invention.

The payment option further comprises sending 4c a validation request from the funds transfer server 30 directly to the user 10. In one embodiment, the validation request may take the form of a "pop-up" window. Alternatively, the request may be a form on a separate page. In this embodiment, the validation page or window will have the same look and feel as the vendor system 20. Consequently, the present method may be more seamlessly integrated into the on line shopping process. The present method may also be adapted for on site purchasing using input consoles at a store, as are known in the art. In response to the request for validation information, the user 10 transmits 4d validation information to the funds transfer server 30.

In one embodiment of the present invention, the validation information and validation request may be presented in a graphical interface resembling a check. For example, an image of a check may be transmitted to the user's terminal having several input fields as might be found on a check, such as payee, date, amount, memo, and signature line where a user might enter a unique identifier or password. In other embodiments, the check image may have certain information already filled in, such as amount, payee, or date, as that information may be included in the purchase data provided by the vendor system 20. The present method may also include a step for accepting or canceling the transaction, such as by including "submit" or "cancel" buttons which the user 10 clicks after completing the check. If the user 10 selects the "cancel" button, the user 10 may be notified that the transaction has been aborted. Other interfaces may also be used within the scope of the present invention to submit validation information.

Validation information may be any data pertaining to the identification of the user 10 or an account of the user 10. For example, if the user 10 has already been assigned a password by the funds transfer server 30, and the funds transfer server 30 has account information for the user 10, the validation information may consist only of a password. Alternatively, the validation information may include name, address, financial institution, account numbers, social security numbers, or any other means for identifying a source of funds available to the user 10.

The payment option further comprises a step for checking 4e the validation information against a database at the funds transfer server 30. In one embodiment, the database includes validation information for users 10 who have previously used the funds transfer server 30. The database allows the funds transfer server 30 to match the user 10 with account information specific to that user 10. Accordingly, the user's 10 account information is maintained logically and physically separate from the vendor system 20 and need not be exposed to the vendor system 20.

If the validation information provided by the user 10 is recognized by the funds transfer server 30, the user is validated and the funds transfer server 30 transmits a vendor authorization 5 to the vendor system 20. Such vendor authorization 5 may include a digital IOU comprising all or some of the purchase data and any unique authorization information that will allow the vendor to redeem the digital IOU and receive funds therefor at a later time. Some embodiments allow piecemeal redemption of a digital IOU when, for example, only part of an order is shipped. Upon redemption 5c, the funds transfer server 30 transfers funds 5a from a user's account 40 to the funds transfer server 30, which then transfers funds to the vendor system 20.

If, on the other hand, the user 10 is not validated, the funds transfer server 30 may return a message 5b to the user 10 that the transaction was denied. Alternatively or in addition, the funds transfer server 30 may send a request to the user 10 for information to create a user account on the system 30 if payment from the FTS 30 is selected in step 4.

Figure 2:
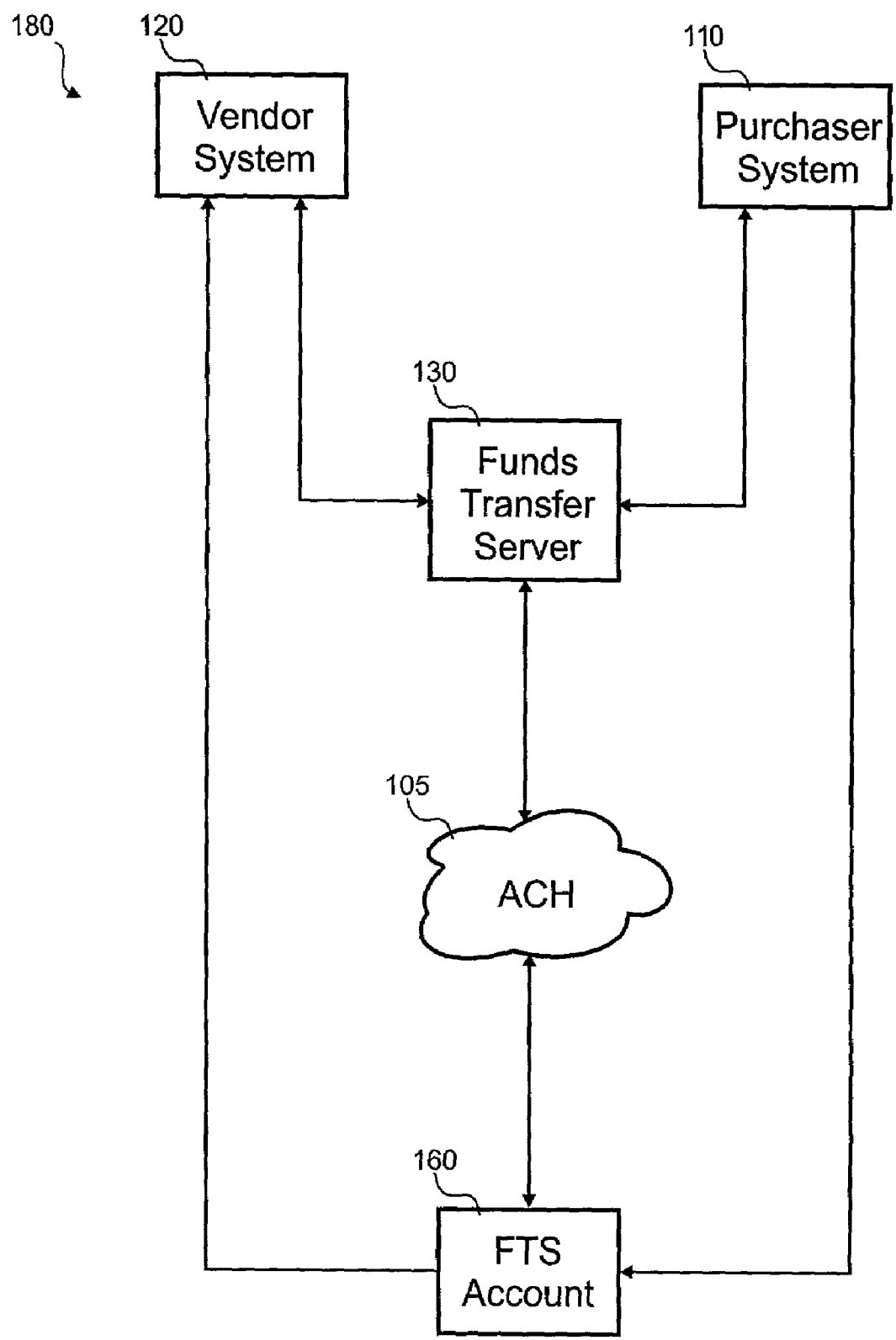
FIG. 2 is a schematic representation of another embodiment of the electronic transfer system in accordance with the present invention.

A further aspect of the present invention, a electronic transfer system 180, is shown in FIG. 2 and designated generally by reference numeral 180. The system 180 comprises a funds transfer server 130 having at least one connection each to a vendor system 120 and a purchaser system 110. In this embodiment, each of the server 130, vendor system 120 and purchaser system 110 are computers. The server 130 and vendor system 120 are network servers having a plurality of network connections and capable of hosting Internet sites. The purchaser system 110 is typically a home computer having a modem or other connection to the Internet. In alternative embodiments, the purchaser system 110 may be a handheld computer, cellular phone, telephone, input console, or any device capable of receiving and transmitting data. Likewise, the vendor system 120 may be any apparatus capable of transmitting or receiving data.

Figure 3:
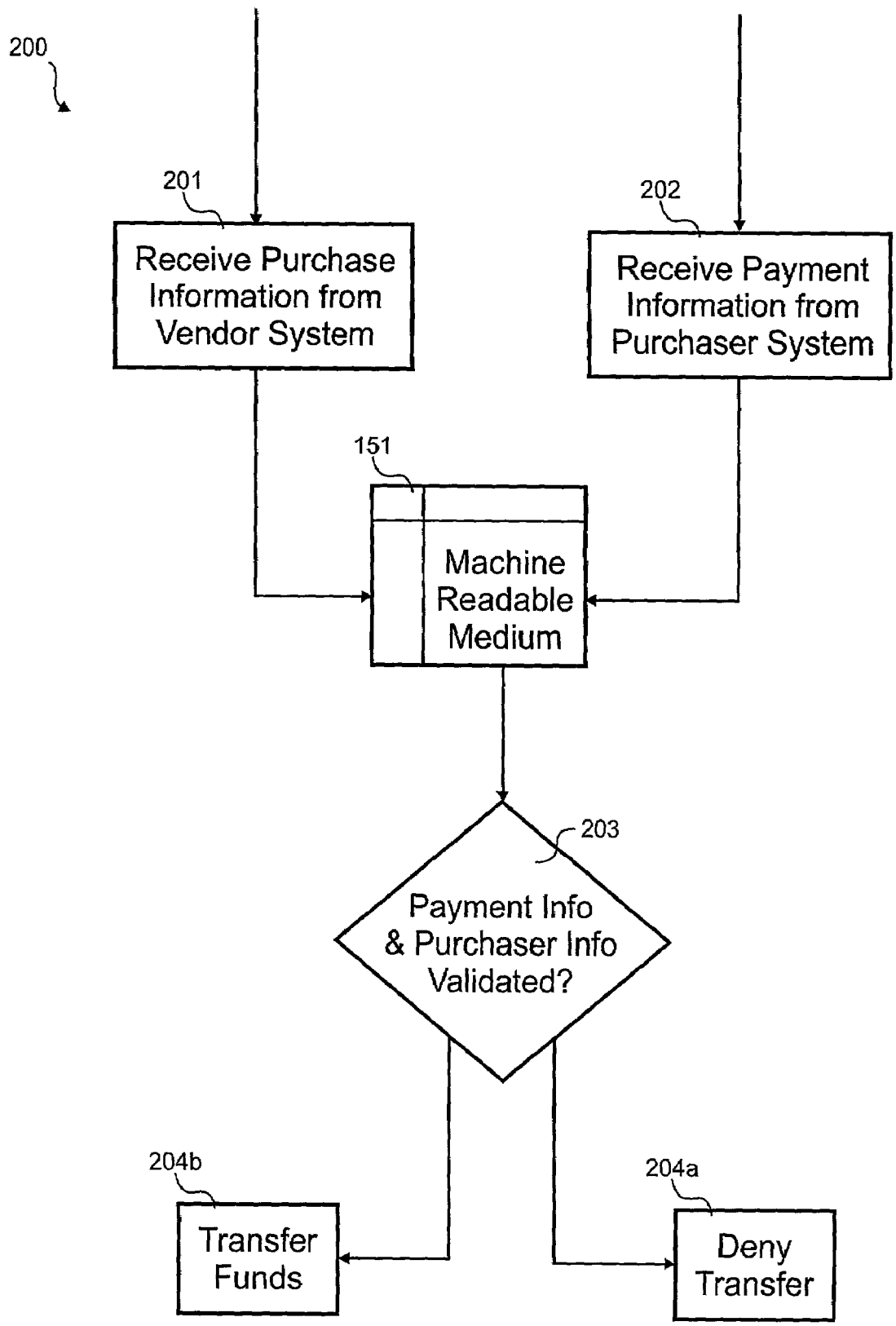
FIG. 3 is a schematic representation of a purchase validation means in accordance with an embodiment of the electronic transfer system of the present invention.

The electronic transfer system 180 further comprises a means for validating a purchase 200 by a purchaser using the purchaser system 110 from a vendor using the vendor system 120, depicted in FIG. 3. In this embodiment, the purchase validation means 200 comprises, either on or in connection to the funds transfer server 130, a machine readable medium 151 having a purchaser database including purchase information thereon. The machine readable medium 151 may be a hard disk, compact disk, read only memory, magnetic tape, smartcard, flash memory, dongle, or other medium capable of storing data. The purchase validation means 200 further comprises receiving purchase information 201 from the vendor system 120 and payment information 202 from the purchaser system 110. Purchase information 201 may include any information capable of identifying the vendor and/or the purchase, including a vendor identification, name of goods, purchase price or other digital signatures. The payment information 202 may include financial information of the purchaser, a purchaser identification, such as a password, a name, address or other unique purchaser identification. Either receiving means 201, 202 may comprise a file transfer protocol, HTTPS interface or other data transfer means as will be known to those with skill in the art.

The purchase validation means 200 further allows validating the purchaser and payment information 203. In one embodiment, the purchaser information is compared to the purchaser database on the machine readable medium to determine if the purported purchaser is authorized to use the present system. The purchaser information may also be compared to third party databases connected to the funds transfer server 130 to perform a risk assessment on the purchaser. Likewise, the payment information may be validated by checking vendor information against a vendor database.

The system 180 further comprises a means for paying the vendor for the purchase. In this embodiment, the means for paying the vendor comprises a connection to an automated clearinghouse (ACH) 105. The ACH network is a national electronic payments network used by financial institutions and corporations for settling accounts. In this embodiment of the present invention, the ACH calculates 105 a net debit or credit position for the payee and payor (i.e., vendor and purchaser) according to the information in the funds transfer server 130. The ACH 105 then posts the net debit or credit position of those parties to the appropriate financial institutions, such as where the parties have accounts. For example, if a vendor has a net credit, the ACH 105 transfers funds from a funds transfer server account to the vendor. On the other hand, a purchaser may post a net debit, and the ACH 105 would transfer funds from the purchaser account to the funds transfer server account. In this embodiment, the funds transfer server account 160 would be an account owned or operated by the administrator of the funds transfer server 130. Hence, in this embodiment, the electronic transfer system 180 may further comprise a funds transfer account 160 through which funds from the ACH may pass to and from a vendor and purchaser account. Through use of the present system 180, funds may be transferred easily from a payor to payee without either party having access to the other party's financial information.

Figure 4A:
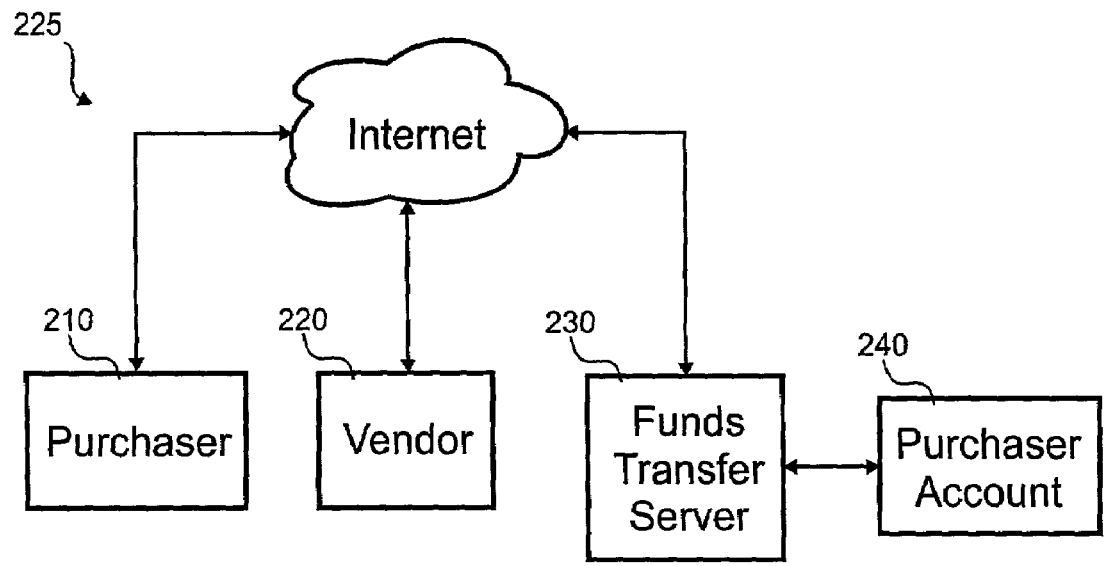
FIG. 4A is a block diagram of yet another embodiment of the electronic transfer system.
Figure 4B:
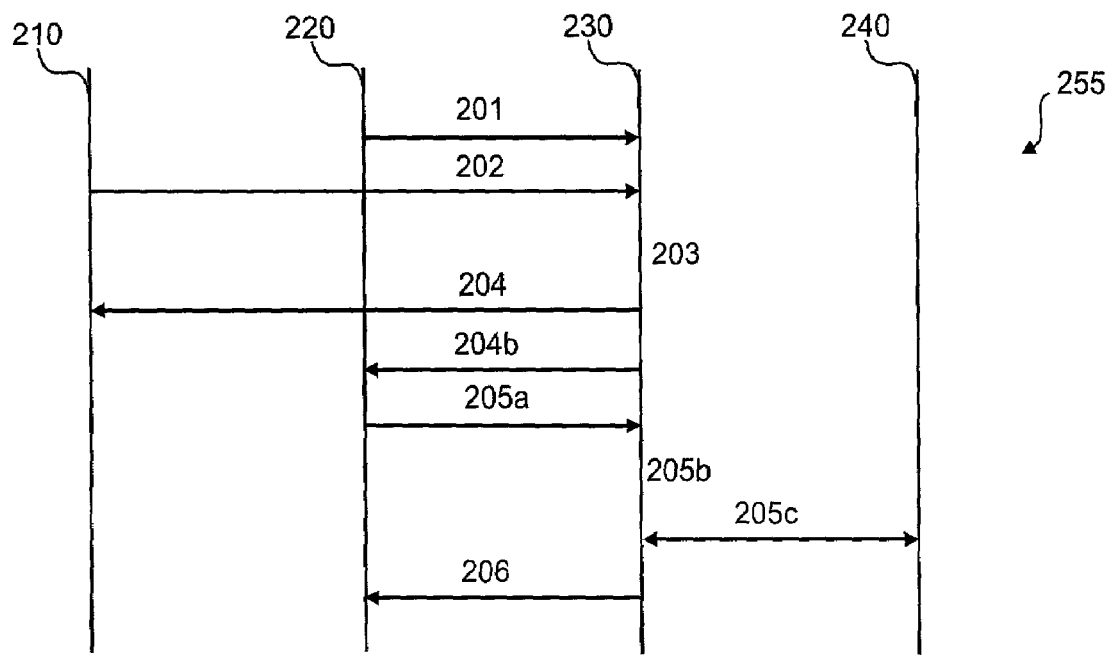
FIG. 4B is a schematic representation of an embodiment of a funds transfer method according to the present invention.
Figure 4C:
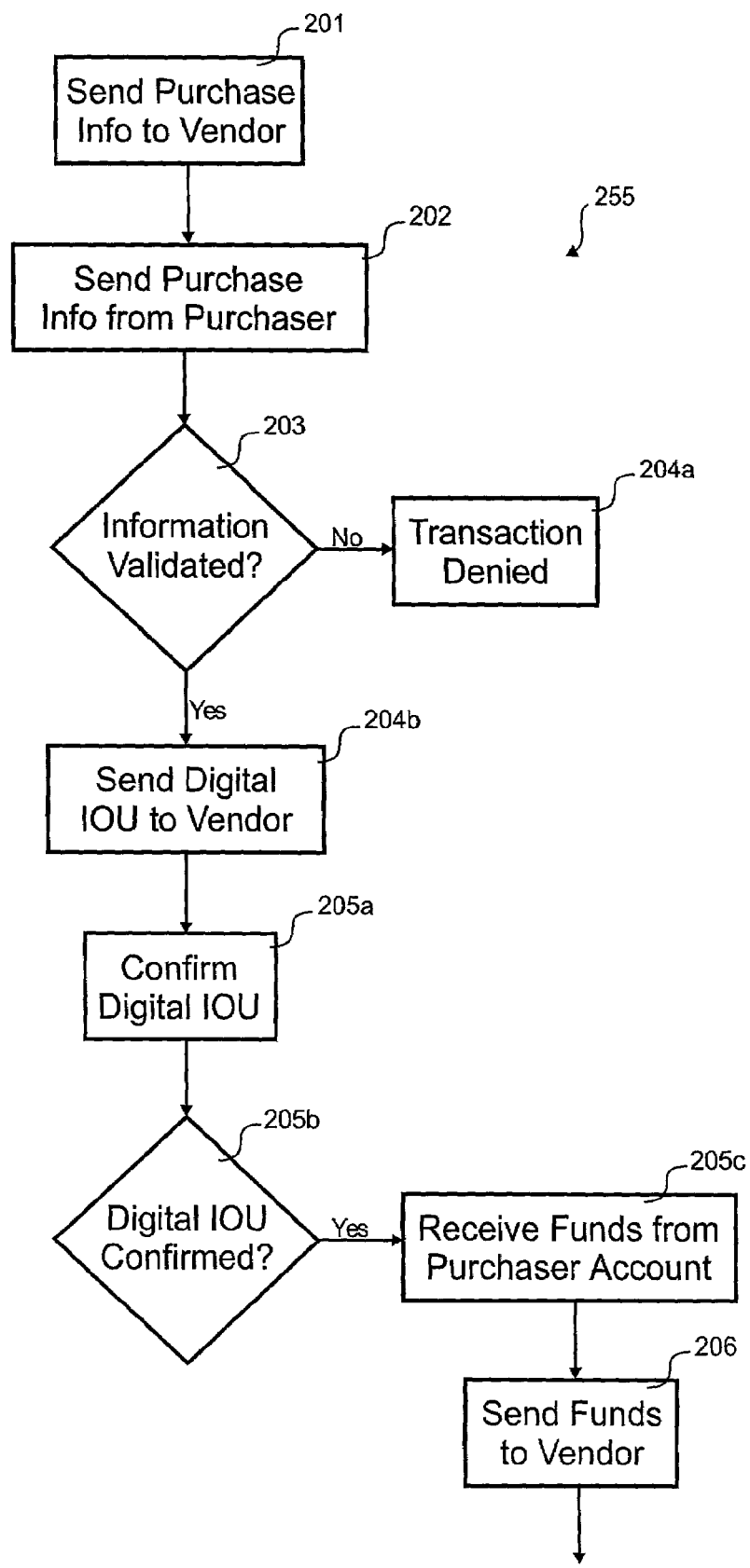
FIG. 4C is a flow diagram of the embodiment of the funds transfer method of FIG. 4B.

Yet another embodiment of the present invention is disclosed in FIGS. 4A–C. In these figures, the funds transfer comprises sending a digital IOU to the vendor 220 so that the vendor 220 may submit a plurality of digital IOU's to the funds transfer server 230 for settlement at, for example, the end of each business day. FIG. 4A shows an embodiment of the electronic transfer system 225 and FIGS. 4B and 4C show an embodiment of a funds transfer method 255.

After selecting a payment option consistent with the present invention, the vendor 220 sends 201 purchase information to the funds transfer server 230. The purchase information should include at least a purchase price for the portion of the transaction being paid for. Purchase information may also include a description of the goods and services being purchased, vendor identification, or other data that may be helpful in organizing and implementing the present method. The funds transfer server 230 also receives 202 purchaser information from the purchaser 210. Such purchaser information should include at least an identification of a purchaser account 240. Moreover, the step for receiving purchaser information is performed directly between the funds transfer server 230 and the purchaser 210 so that purchaser information is not exposed to the vendor 220. Purchaser information may be similar to the validation information of FIG. 1B, and may be obtained in a similar fashion.

After receipt of the purchaser information, the funds transfer server 230 validates 203 the purchaser information. The step for validation 203 may include comparing purchaser information to validation information contained in or accessible to the funds transfer server 230. The step for validation 203 may also include a step for determining whether the funds transfer server 230 is authorized to access the purchaser's account 240.

If the purchaser information is not validated, a message may be sent 204a to the purchaser that the electronic transaction has been denied. Alternatively, the funds transfer server 230 may send a request for additional purchaser information and additional information to set up a user account on the system 230.

If validated, the funds transfer server 230 sends 204b a digital IOU to the vendor 220. Later, the vendor 220 redeems the digital IOU. The vendor 200 may redeem multiple digital IOU's all at the same time by running in batch mode, whether or not they originate from the same transaction or same purchaser 210. In batch mode, the vendor 200 may create a file containing a list of digital IOU's to be redeemed, including relevant identification information pertaining thereto. The step for redeeming the digital IOU comprises receiving 205a the digital IOU from the vendor 220. Digital IOU's may be transmitted and received using any File Transfer-Protocol (FTP) or HTTPS file transfer interface, and such systems are well known in the art. Alternatively, the vendor 220 or administrator of the funds transfer server 230 may create its own data transfer systems.

Once received, the funds transfer server 230 confirms 205b the digital IOU. The step for confirming 205b may comprise comparing a digital signature included on the digital IOU against a digital signature log created in the funds transfer server 230 to determine the authenticity of the digital IOU and to determined the identity of the purchaser 210 to which the digital IOU pertains. Other steps for confirming the digital IOU may comprise processing the file of multiple digital IOU's to ensure the authorization or identification information contained within the file for each digital IOU is valid.

Once confirmed, the funds transfer server 230 accesses the purchaser account 240 and receives 205c funds to cover the amount of the digital IOU or digital IOU's. Those funds are transferred 206 to the vendor 220. Alternatively, the funds transfer server 230 may send a status report to the vendor 220 for digital IOU's already settled. In one embodiment, the funds transfer server 230 may generate a settlement file with two entries for each digital IOU—one transferring funds from the purchaser account 240 to the funds transfer server 230, and another transferring funds to the vendor 220. Because the funds transfer occurs using a "middleman" (purchaser account 240 to funds transfer server 230 and funds transfer server 230 to vendor 220), funds are transferred between the vendor 220 and purchaser 210 without either having access to the other's account information. The steps for transferring funds to and from the funds transfer server 230 typically involve the use of an ACH 105.

Where the vendor 220 waits to redeem digital IOU's, the vendor 220 may continue to conduct transactions with the present purchaser 210 or others while waiting to settle accounts at a later time. The present embodiment may be particularly useful for consumer-to-business and businessto-business e-commerce transactions in which a vendor 220 may have multiple transactions each day. The vendor 220 may choose the present embodiment to allow settlement of all of the day's digital IOU's at the end of the business day, or at a time when traffic to the vendor's e-commerce Internet site may be reduced, such as overnight.

Figure 5A:
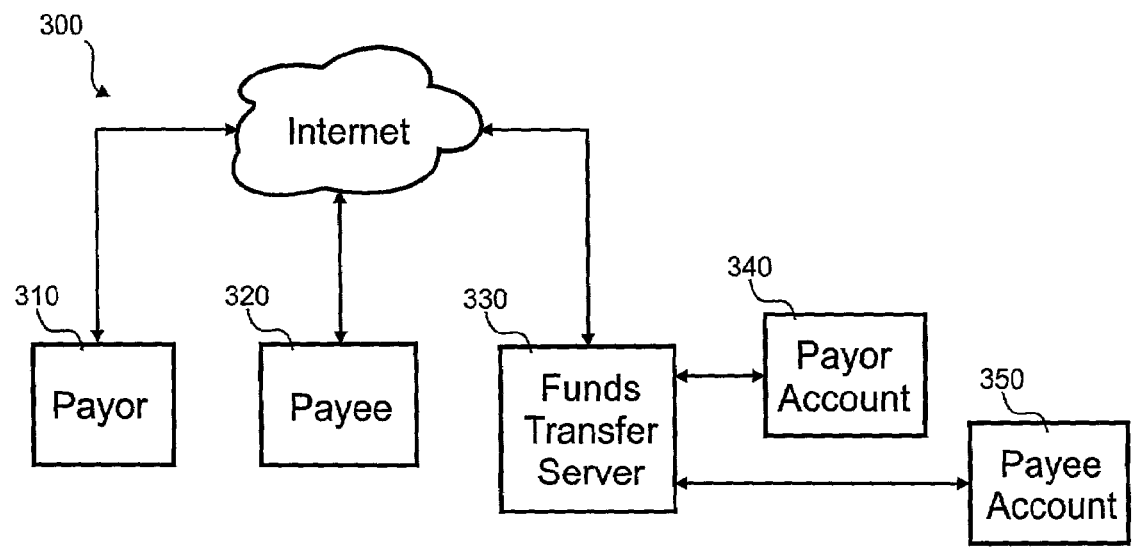
FIG. 5A is a block diagram of still another embodiment of the electronic transfer system.
Figure 5B:
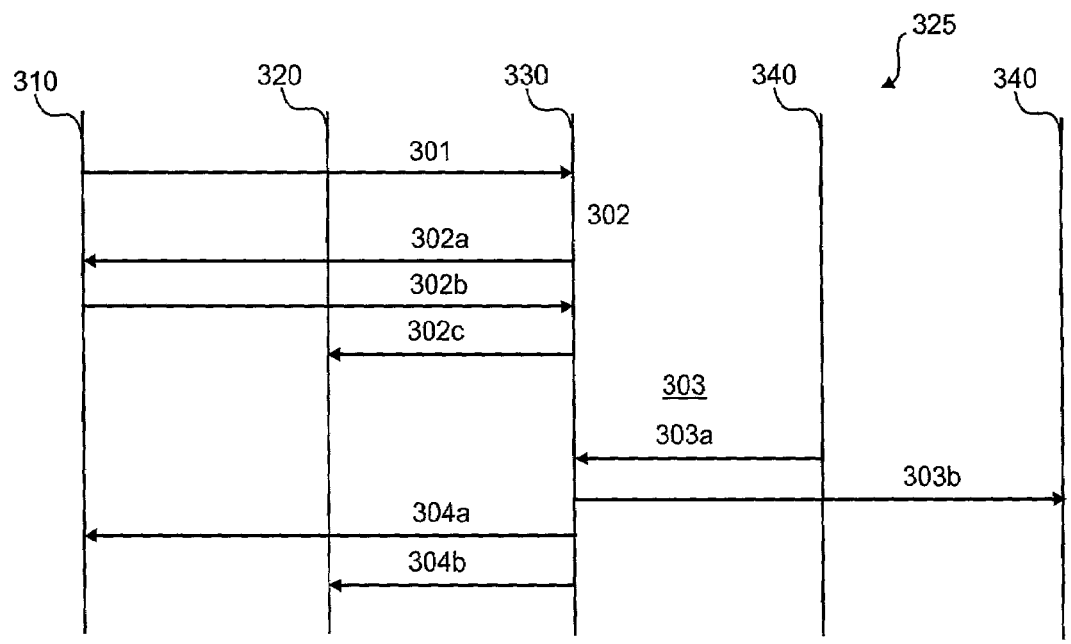
FIG. 5B is a schematic representation of an embodiment of a funds transfer method according to the present invention.
Figure 5C:
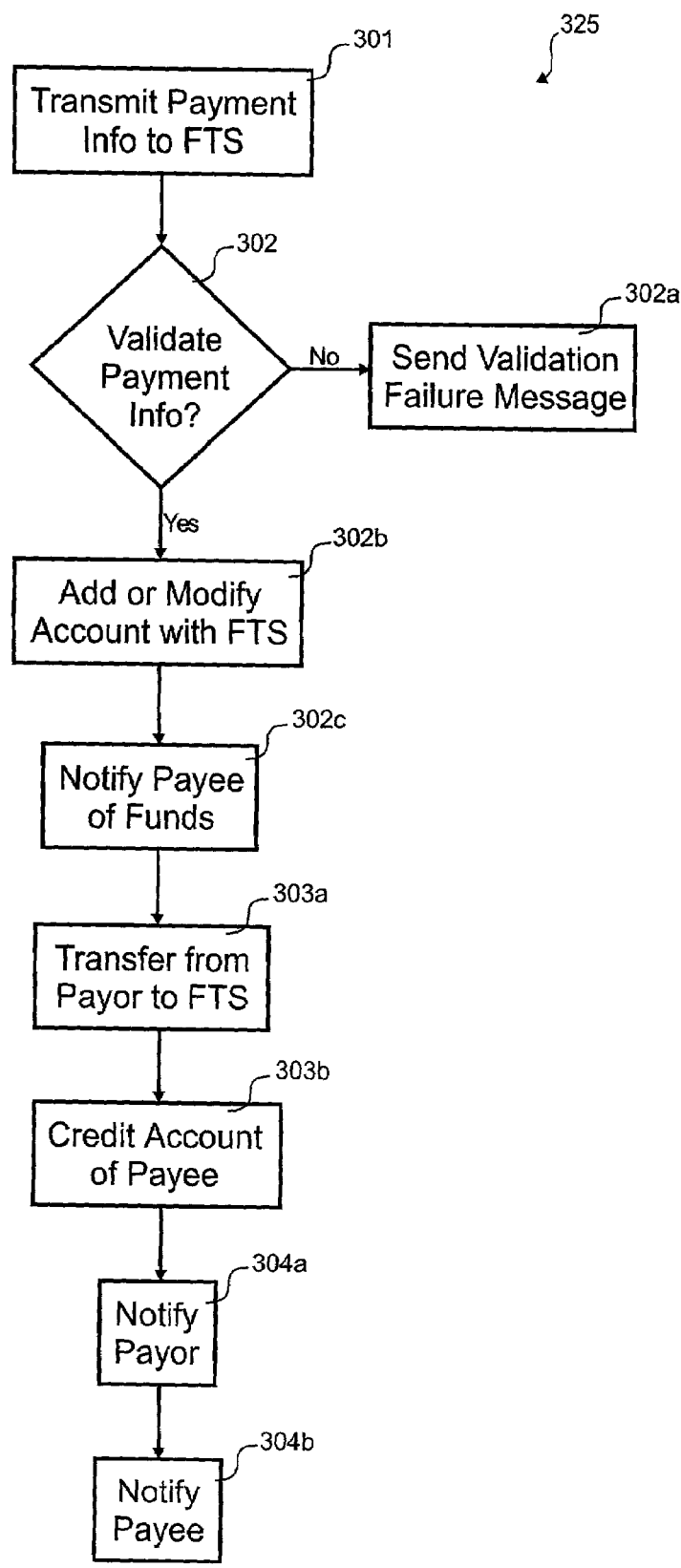
FIG. 5C is a flow diagram of the embodiment of the funds transfer method of FIG. 5B.

Referring now to FIGS. 5A–C, the present invention also includes a consumer-to-consumer (payor 310 to payee 320) funds transfer apparatus and method. FIG. 5A shows another embodiment of the electronic transfer system 300 and FIGS. 5B and 5C show an embodiment of the consumer-to-consumer funds transfer method 325. The present embodiment may be particularly useful for sending gifts, but may also be applied to funds transfers for any purpose, including settling personal debts. The method 325 comprises transmitting 301 payment information to the funds transfer server 330. In one embodiment, a payor 310 may access the funds transfer server 330 through a web browser on payor's personal computer, although all systems capable of connecting a payor 310 to a funds transfer server 330 are intended to be within the scope of this invention. Through the web browser, the payor 310 may connect to a funds transfer server site that requests specific information. Such requests may require the payor 310 to fill out a form with specific information necessary to allow the funds transfer server 330 to perform the transaction. Such form may include an image of a check.

The payment information may include payee identification, payor identification and a payment amount. The payor identification may be any information that will allow the funds transfer server 330 to confirm the identity of the payor 310 and have access to a payor account 340. Such payor information is similar to the validation information described herein. Payee identification is provided to the payor for submission to the FTS 330 and may comprise any useful identification of the payee, such as an e-mail address or other means for identifying and/or contacting the payee. Such identification may also include a unique funds transfer server identification.

The funds transfer server 330 next validates 302 the payment information. The validation step 302 may comprise determining whether the payment information is accurate or recognized by checking the payor and payee identifications against a database in the funds transfer server 330. The database may include account information for the payor and payee. In one embodiment, both the payor 310 and the payee 320 are validated against third party databases which the funds transfer server 330 may access over a network. Such validation step 302 may further comprise checking third party databases to see whether either the payor 310 or payee 320 has unusual traffic patterns (e.g., questionable or suspicious transaction activity), consumer complaints, questionable credit history, reports of overdrawn checks, or other information useful in assessing the risk of a particular transaction.

If the payor 310 is not validated, a message is sent 302a to the payor 310 that the transaction is denied. The notice may also invite the payor 310 to add himself 302b to the funds transfer server 330, such as by submitting a form from an Internet site or returning an e-mail questionnaire, so that the payor 310 may conduct future transactions using the funds transfer server 330. If the payee 320 is unrecognized, the funds transfer server may later require the payee 320 to be added to the database before transferring funds. If both the payor 310 and payee 320 are validated 302, the funds transfer server 330 may send a message 302c to the payee 320 indicating, for example, that the payee 320 has received funds. The message may be transmitted via e-mail, regular mail, instant message, wireless access protocol (WAP) message, network message, regular mail, voice mail, telephone call, facsimile or other means of communication. In this embodiment, the message does not contain any financial information of the payor 310.

The step for transferring funds 303 to the payee account 350 typically includes the use of the ACH 105. In one embodiment, a request is made from the funds transfer server 330 to the ACH 105 to transfer funds 303a from the payor account 350 to the account of the funds transfer server 330. The payee 320 may claim the funds by accessing the funds transfer server 330, such as by visiting an Internet site, and entering payee information and/or information identifying the transaction. If validated, an entry is sent to the ACH 105 to credit 303b the payee account 350 and debiting the account of the funds transfer server 330. The funds transfer server 330 may also notify 304a, 304b the payee 320 and payor 310 that the funds transfer has been completed. Such notification may include, without limitation, e-mail, regular mail, instant message, wireless access protocol (WAP) message, network message, regular mail, voice mail, telephone call, or facsimile.

Alternatively, the funds transfer server 330 may contact the payee 320 to request payee information suitable to permit the funds transfer. The payee 320 may also be required to confirm identity by, for example, responding to a specific criteria or questions provided to the funds transfer server 330 by the payor 310. Such criteria may include information known to the payor 310 and payee 320 but not otherwise generally known, such as social security number, drivers license number, telephone number, birthday, or other information capable of confirming the identity of the payee 320. This information may be checked against information provided by the payor 310 to the funds transfer server 330, or may be forwarded to the payor 310 for confirmation, such as by e-mail.

According to one embodiment, the step for transferring funds may further require the payee 320 to claim the funds through a web browser or Internet connection. For example, the payee 320 may receive an e-mail containing a link to a unique URL. The URL may contain a unique query string to identify the payee 320 and/or the transaction. The payee 320 clicks on the link and is presented with an authorization query, typically a password included in a database at the funds transfer server 330 for identifying the payee 320. Once the payee 320 is authorized, the payee 320 is brought to a "funds claim" Internet page, such as the page identified by the unique URL. The payee 320 may then choose to accept the funds by, for example, clicking on a button labeled "Accept", at which time the funds transfer server 330 may request the identity of the payee account 350 if unknown. Once the payee account 350 is identified, funds may be transferred through the ACH 105 and the payor 310 may be notified of the completed transaction.

Figure 6:
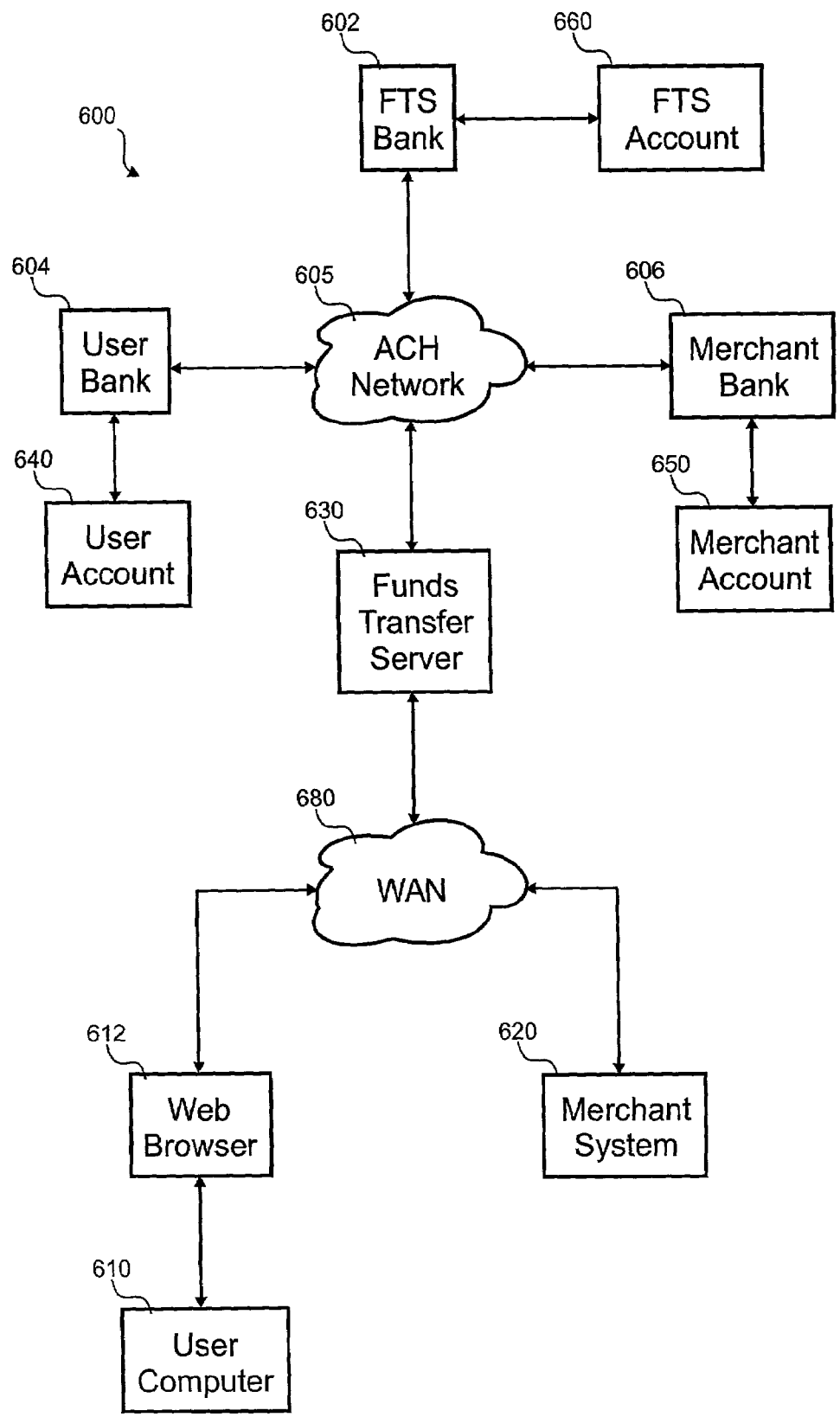
FIG. 6 is a block diagram of another embodiment of the electronic transfer system.

With reference to FIG. 6, a block diagram of another embodiment of the electronic transfer system 600 is shown. This embodiment shows banks 602, 604, 606 coupled to an ACH network 605. A FTS bank 602 has a corresponding FTS account 660, a user bank 604 has a corresponding user account 640 and a merchant bank 606 has a corresponding merchant account 650, where the accounts 640, 650, 660 are bank accounts. In addition to bank accounts, other embodiments could transfer funds between credit cards, debit cards, promotional programs, check printers, agent locations that accept funds, stored value accounts, etc. In some circumstances, two or more of the FTS, user and merchant banks 602, 604, 606 could be the same bank.

A user computer 610 runs a web browser application 612 to interact with a merchant system 620 and a funds transfer server 630. Communication between the web browser 612, the merchant system 620 and the FTS 630 is over a wide area network (WAN) 680 in this embodiment. Other embodiments could use any network, such as the Internet, instead of a WAN. As those skilled in the art can appreciate, the funds transfer server 530 could be a single computer or many computers that are connected by a network to perform as one.

On behalf of the user and the merchant, the funds transfer server 630 choreographs funds transfers between the user and FTS accounts 640, 660 and between the FTS and merchant accounts 660, 650 during a purchase. Once a payment is authorized, a digital IOU is issued to the merchant system 620. Upon completion of the purchase, typically after delivery, the merchant system 620 requests payment for the digital IOU from the FTS 630. The FTS initiates a first electronic funds transfer (EFT) between the user account 640 and the FTS account 660 and a second EFT between the FTS account 660 and the merchant account 650. EFT requests take a few days before the funds clear the target bank account. In some circumstances there may be float or reverse float that is either absorbed by the FTS 630 or passed to the user and/or merchant as a service fee.

Figure 7:
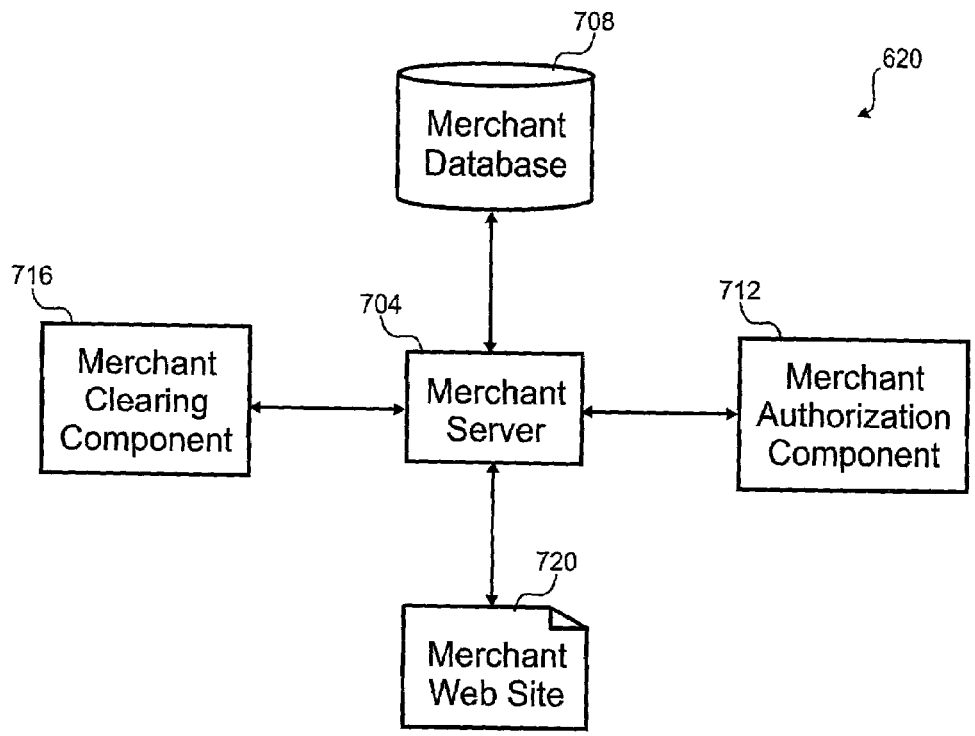
FIG. 7 is a block diagram of an embodiment of a merchant system.

Referring next to FIG. 7, a block diagram of an embodiment of the merchant system 620 is shown. A merchant server 704, which could include one or more computers, manages operation of the merchant system 620. A merchant web site 720 runs on the merchant server 704. Users interact with the merchant web site 720 to select goods and/or services for purchase.

The merchant web site 720 interacts with a merchant authorization component 712 and a merchant clearing component 716 to integrate the functionality of the merchant system 620 with the FTS 630. The merchant authorization component 712 communicates with the FTS 630 using the proper format, protocol, encryption and digital signatures during the authentication process where a user performs authorizes payment by the FTS 630. Communication during the clearing process is facilitated by the merchant clearing component 716 in a similar way.

Depending upon a business model of the merchant, various information is stored in a merchant database 708. In this embodiment, digital IOUs, shipping addresses, user names, user passwords, past invoices, shipping status, and payment status is stored in the database 708. The payment status may include where in the settlement process is a particular payment. For example, the payment status may indicate that a digital IOU was issued two days ago, a clearing file was submitted yesterday and a settlement file today indicated the EFT had cleared. In some circumstances, the merchant may wait for the EFT funds to clear before sending the goods and/or service to the user.

Figure 8:
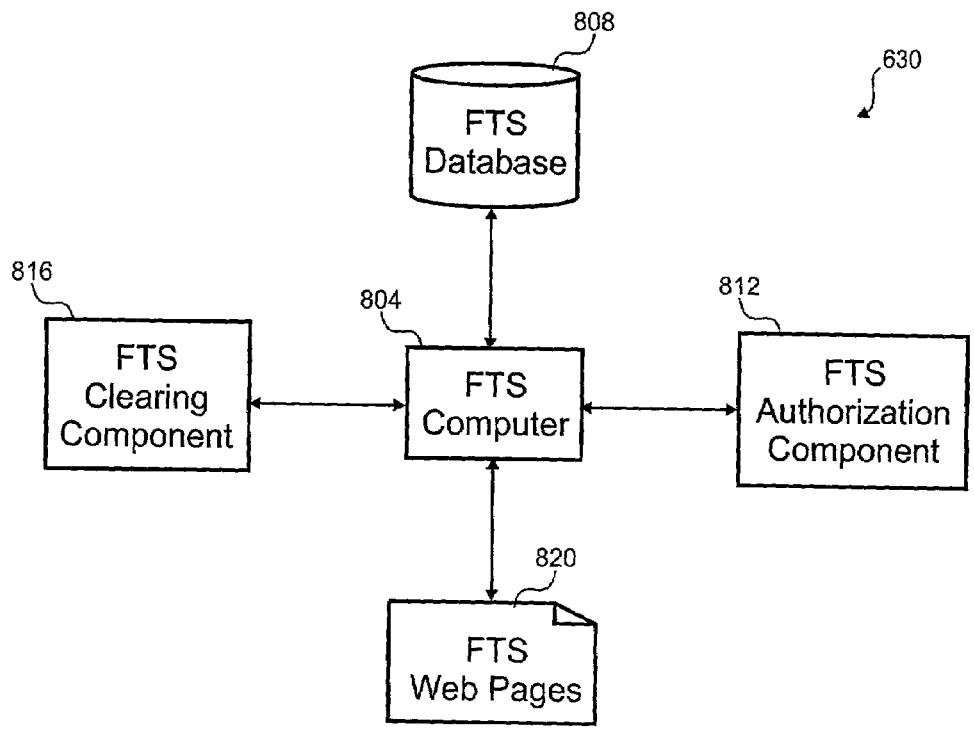
FIG. 8 is a block diagram of an embodiment of a funds transfer server.

With reference to FIG. 8, a block diagram of an embodiment of a funds transfer server 630 is shown. In this embodiment, the funds transfer server 630 interacts with many users, merchants, payees, payors, and others that send money to authorize and clear those transfers while minimizing the transfer of private information. Included in the FTS 630 are a FTS computer 804 that hosts a FTS clearing component 816, a FTS authorization component 812, FTS web pages 820, and a FTS database 808. Those skilled in the art appreciate that the FTS computer 804 could be one or more computers located in one or more locations where those computers are interconnected by some sort of network. Also, some blocks of the diagram could be combined into one as those skilled in the art appreciate. Further, other components of these and other blocks diagrams described in this specification could be so divided or combined.

Interaction with the FTS 630 is typically encrypted to protect privacy and digital signatures are used to verify identity. In one embodiment, 128-bit secure sockets layer (SSL) encryption is used along with digital signatures that use asymmetric keys. Those skilled in the art appreciate that any mechanisms for protecting the interaction from interception and verifying the parties could be used.

The FTS authorization component 812 interacts with the merchant and user to verify their identities and authorize the money transfer. Specifics of the transaction are gathered by the FTS authorization component 812 from the merchant authorization component 712. Those specifics are presented to the user through interaction with FTS web pages 820. The user can specify the source of the funds and authorizes the transfer. That authorization is recorded for the user in the FTS database 808 along with a digital IOU for the merchant. The FTS authorization component 812 notifies the merchant authorization component 712 of the digital IOU.

Once a digital IOU is issued to the merchant or payor, the merchant system 620 interacts with the FTS clearing component 816 to complete the money transfer. Once the item is delivered, the service performed or other condition of the transfer is performed, the digital IOU is redeemed by adding an entry to a clearing file that is sent by the merchant clearing component 716 to the FTS clearing component 812. The information in the clearing file is stored in the FTS database 808. Once one or more entries are received in the clearing file, those transfers are formulated and requested from the ACH network 605 by the FTS clearing component 816. Any response from the ACH network 605 is recorded in the FTS database 808. The merchant clearing component 716 can receive status on all transfers to that merchant 620 by requesting a settlement file that includes current status on each transaction from the FTS database 808.

The FTS web pages 820 serve as the interface to the FTS 630. In addition to facilitating the authorization process with web pages, anyone with an account at the FTS 630 can use the FTS web pages 820 to view their payments and/or receipts. The status of each transaction is also shown using a checkbook register-like paradigm. The account holders can specify the source of funds for transactions. Where there are more than one source specified, a default one is specified that can be overridden during the authorization process. For those that receive money using the FTS, acceptable payment types can be specified. For example, a merchant may specify that VISA™ and stored value funds are the only payment sources that are accepted. During the authorization process, the payment options presented to the user are reduced by those accepted by the merchant.

Figure 9:
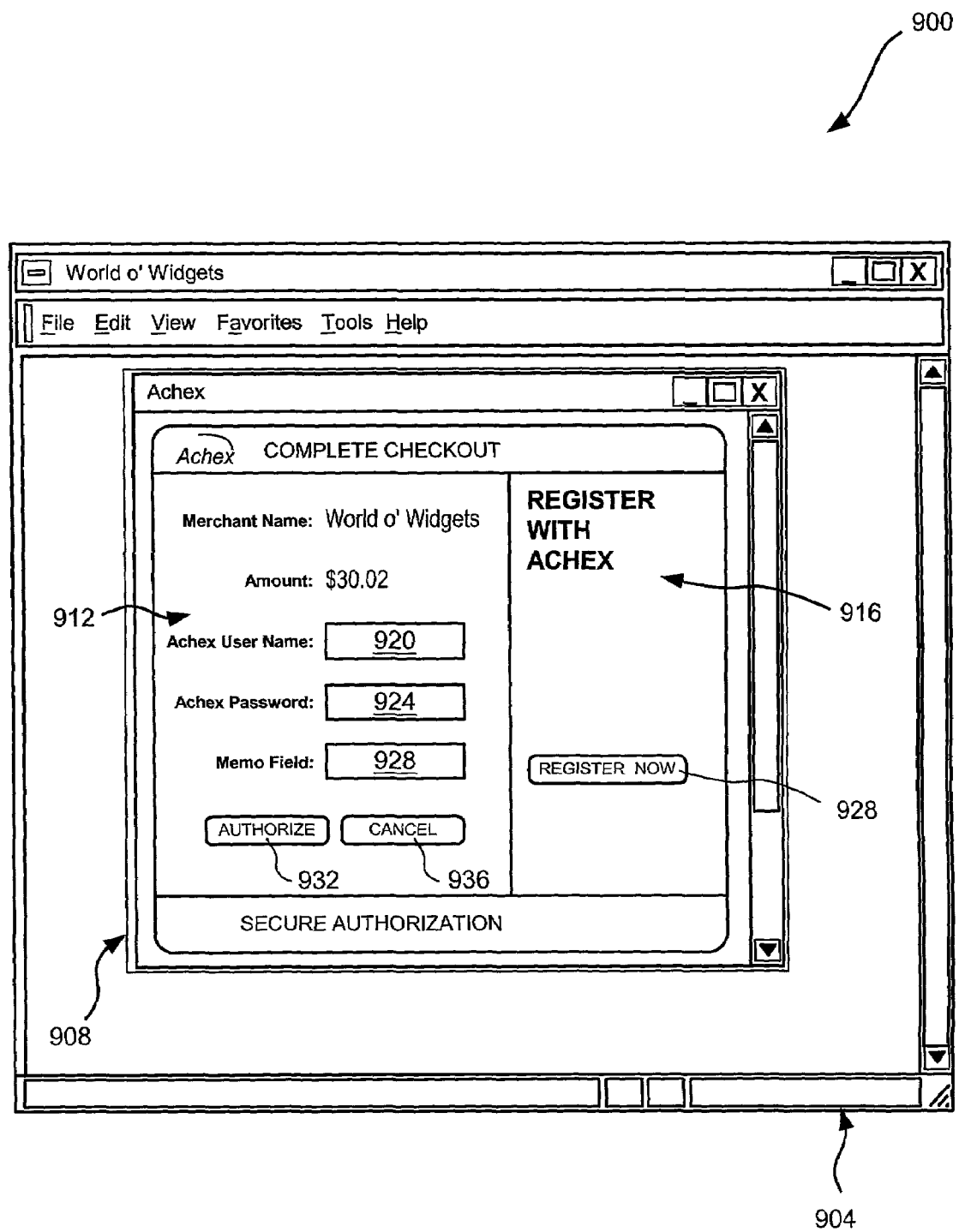
FIG. 9 is a screen shot of an embodiment of a checkout window overlaying a merchant window.

Referring next to FIG. 9, a screen shot 900 of an embodiment of a checkout window 908 overlaying a merchant window 904 is shown. The checkout window 908 is called by the merchant during the checkout process to solicit authorization from the user. In this embodiment, the checkout window 908 overlays a merchant window 904. The checkout window has an authorization portion 912 and a registration portion 916. The registration portion 916 allows new users to add an account to the FTS 630 by clicking on a "register now" button 928 before returning to authorize the transfer.

The authorization portion 912 of the checkout window 908 allows authorizing the transfer to the merchant. In this embodiment, the merchant supplies the merchant name and amount. Some embodiments could use information from the merchant to also populate the user name and memo fields 920, 928. To authorize the transfer, the user enters the user name 920, a FTS password 924, and an optional memo 928 before clicking the "authorize" button 932. The memo field 928 is maintained in the FTS database 808 and is shown when the transaction is later viewed and may be passed to the user bank 604 for inclusion on the bank statement. Some embodiments may include a drop down menu to specify a source for the transfer if the default is not desired. If the user wishes to cancel the transfer, the "cancel" button is activated, whereafter the cancellation is reported back to the merchant authorization component 712.

Figure 10:
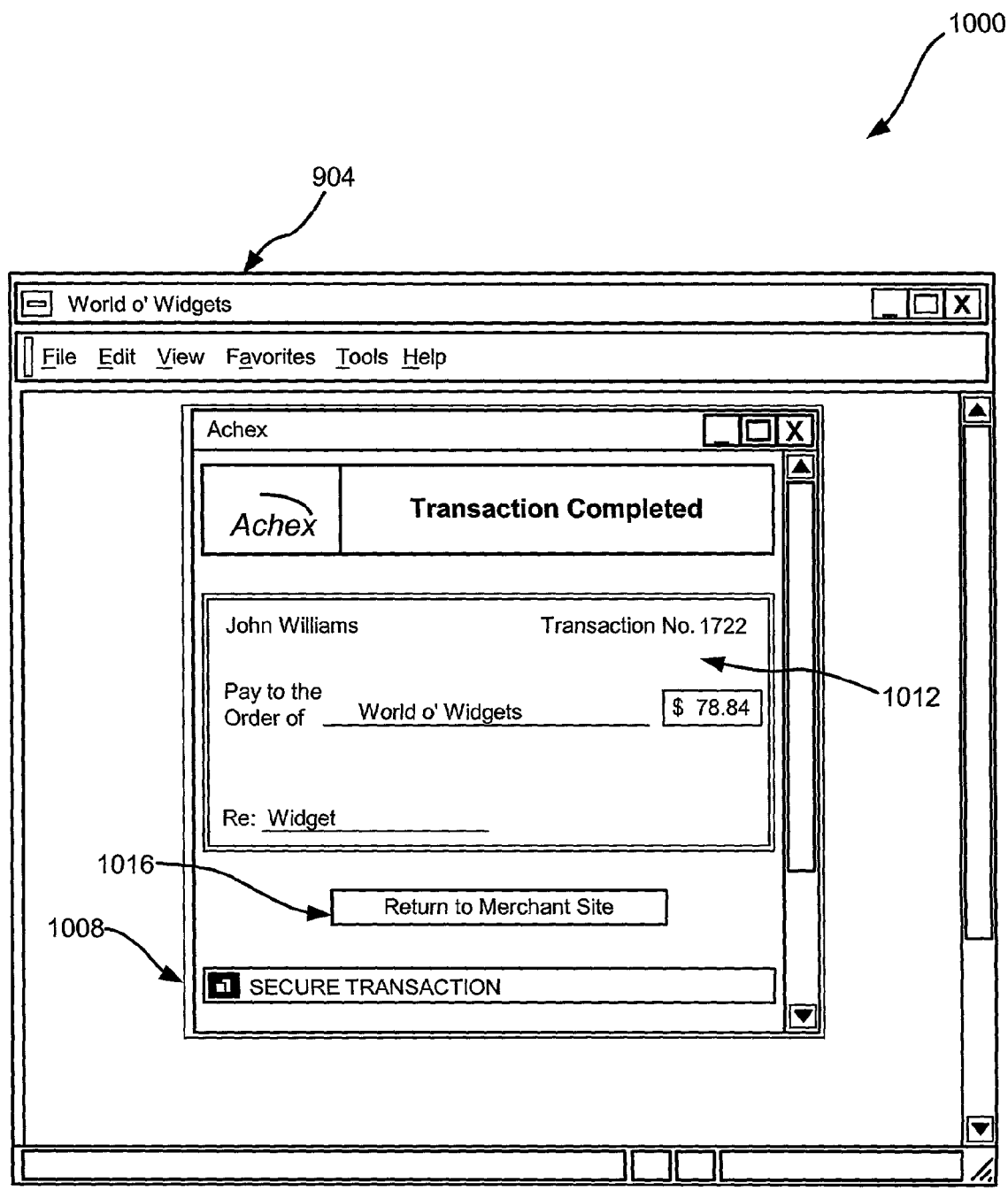
FIG. 10 is a screen shot of an embodiment of a confirmation window overlying the merchant window.

With reference to FIG. 10, a screen shot 1000 of an embodiment of a confirmation window 1008 overlying the merchant window 1004 is shown. After the user successfully approves the transaction with the checkout window 908, the confirmation window 1008 is presented to the user. A check pictogram 1012 is presented in the confirmation window that includes the memo field 928 on the "Re:" line, the merchant name, the amount, the user name, and a transaction number in a manner similar to a traditional paper check.

Once viewing of the confirmation window 1008 is complete, the "return to merchant site" button 1016 is activated. In this embodiment, activation of that button 1016 closes the confirmation window 1008 to reveal the underlying merchant window 904. In other embodiments, a script customized for the merchant is activated upon clicking the return button 1016. This script could redirect the confirmation window back to the merchant site such that an underlying merchant window 904 is superfluous. In some embodiments, the script could pull up an advertisement or any other task capable of being scripted.

Figure 11:
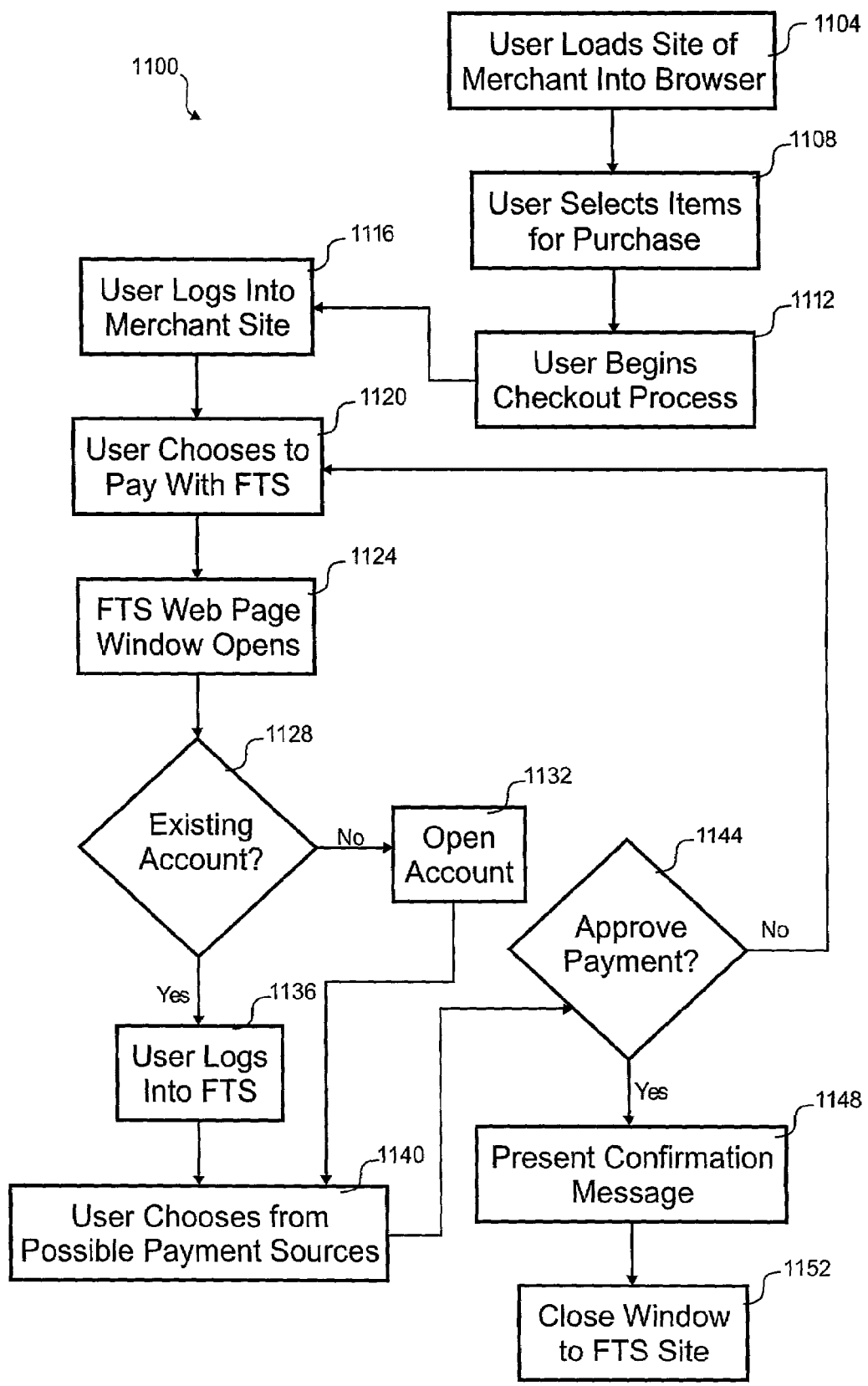
FIG. 11 is a flow diagram of an embodiment of a process for authorizing a payment from a perspective of a user.

Referring next to FIG. 11, a flow diagram of an embodiment of a process 1100 for authorizing a payment from a perspective of a user is shown. This diagram shows the portion of the process 1100 that includes choosing a item for purchase from the merchant web site 720 through the authorization of that purchase. Those skilled in the art appreciate that is process is equally applicable to person-to-person payments where selection of merchandise is typically not done, but the authorization process is similar.

The depicted portion of the process 1100 begins in step 1104 where the user points the web browser 612 to the merchant web site 720 by following a link or otherwise specifying a URL. The merchant web site 720 is browsed to select one or more items for purchase in step 1108. In some embodiments, such as with charitable giving, nothing tangible is selected, but nonetheless, a transfer of money to the charity is preformed. Once all items are selected for purchase, the checkout process begins step 1112. How the merchant organizes the checkout process may vary in various embodiments.

In this embodiment, the user logs into the merchant site in step 1116 if this step has not already been completed. This process presumes the user chooses to pay the merchant with a transfer from the FTS 630. Some embodiments could have the merchant supply other payment options such as credit card, check, stored value accounts, etc. that could avoid the use of the FTS. Other embodiments could allow the FTS 630 to accept these forms of payment or a subset of these specified by the merchant.

In step 1124, the checkout window 908 from the FTS web pages 820 is opened to overlay the merchant window 904. The merchant window 904 may display a status message or information to assist the user in the purchase. For example, the merchant window 904 may say "awaiting authorization" or "if the FTS window didn't automatically open click this link." In step 1128, the user either interacts with the authorization or registration portions 912, 916, which is dependent on whether the user is already registered with the FTS 630. Where there is not current registration, a new account is opened in step 1132 which may involve interacting with another window that is closed after registration to uncover the checkout window 908. If an account already exists, processing continues from step 1128 to step 1136 where the user logs into the FTS 804.

Once an account is logged into or otherwise created, user may override a default payment source to select any payment source in step 1140 that is configured for the user. Some embodiments may cull down the possible payment sources to those honored by the merchant. In step 1144, the user has the option of approving the payment. Information on the transaction such as the merchant, total charge, etc. are presented to aid the user with the decision. If the user cancels payment through the FTS 630, a status message may be presented before closing the FTS window and returning the user to the merchant web site 720 by looping back to step 1120 where a payment method other than the FTS 630 can be chosen.

Where the payment is approved in step 1144, a confirmation window 1008 is presented in step 1148 to confirm the payment. The user can click a button 1016 to close the confirmation window 1008 and return to the FTS web site 820 in step 1152. In some embodiments, the merchant may customize the confirmation window 1008 and customize the action taken when the button 1016 is pressed.

Figure 12:
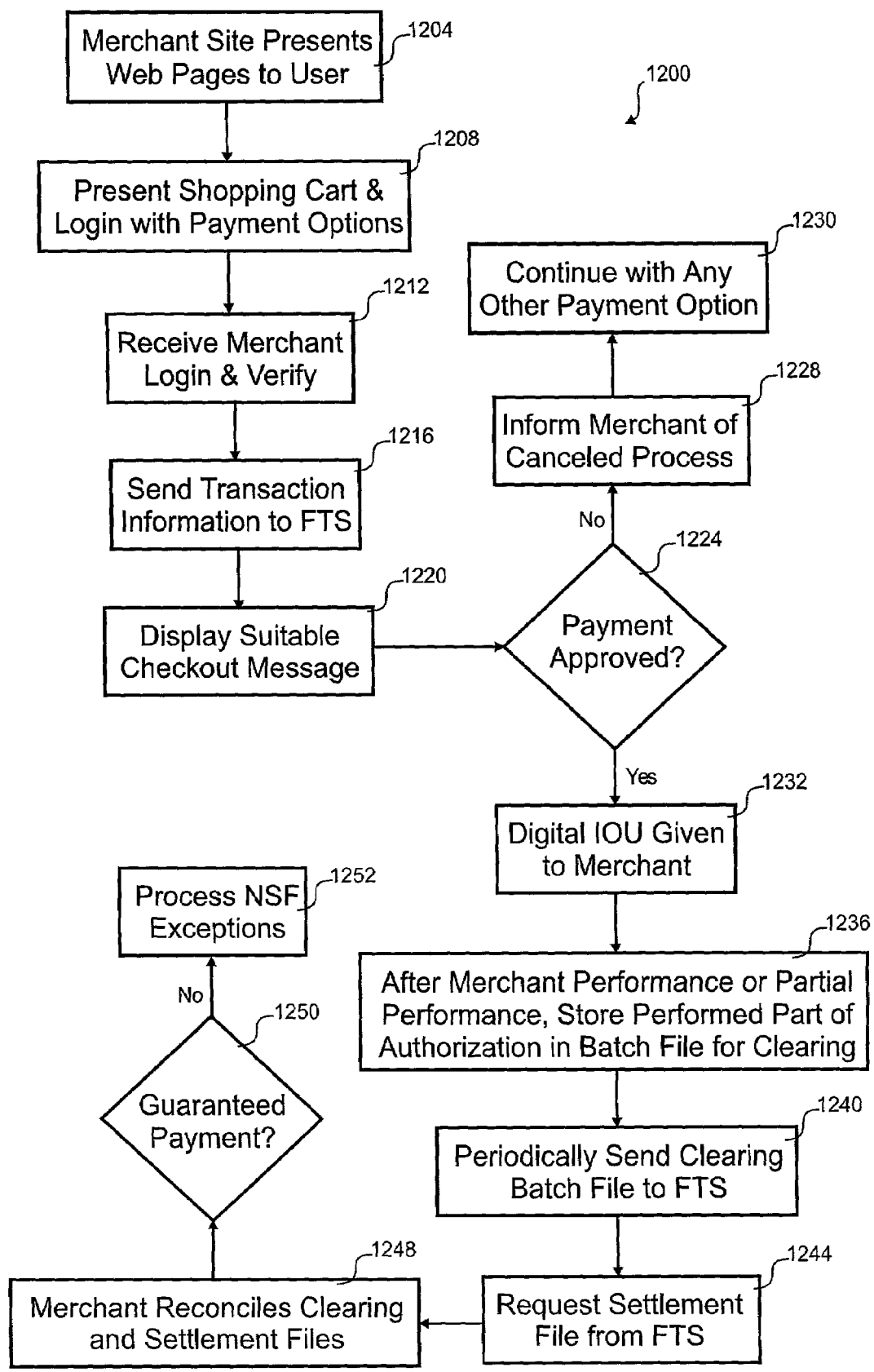
FIG. 12 is a flow diagram of an embodiment of a process for authorizing and clearing the payment from a perspective of the merchant.

With reference to FIG. 12, a flow diagram of an embodiment of a process 1200 for authorizing and clearing the payment from a perspective of the merchant is shown. The depicted portion of the process 1200 starts in step 1204 where the merchant web site 720 presents web pages to the user to elicit a sale. As the user shops, items are added to the shopping cart. Once done shopping, the user initiates the checkout process and the merchant site 720 presents the shopping cart to the user with login name/password request and payment options. In this embodiment, the login name/password authenticates the user for the merchant alone in step 1212.

Other embodiments might present a login that is secured by the FTS 630. The FTS 630 would inform the merchant of a successful login. The FTS 630 would serve as the repository for confidential information such as credit cards, bank accounts, home addresses, phone numbers, etc. for each user. Only the information necessary to the transaction is transferred from the FTS 630 to the merchant system 620 such as a delivery address or credit card information. The user could avoid re-entering this information at every merchant so long as that merchant could interface to the FTS 630 for this information.

Once the user is authenticated, and the FTS 630 is chosen for payment, the merchant opens a secure channel to the FTS authorization component 812 and passes transaction information such as a merchant identifier, an amount, billing and shipping addresses, reoccurring payment periodicity, a digital signature, and any other information on the user, merchant and transaction in step 1216. The merchant identifier and digital signature allow verifying the identity of the merchant. Once the merchant is known, a check of the FTS database 808 retrieves specific information on that merchant for use in displaying a checkout window. Although not shown in the figure, users without accounts can configure one before authorizing payment.

In step 1224, the user can choose to authorize payment to the merchant. Where the user activates the "cancel" button 936, processing continues to step 1228 where the merchant is informed of the cancellation in step 1228. Some embodiments may present the user with a confirmation of their cancellation in a window. If the user closes the FTS window or otherwise aborts the checkout process, the merchant is notified after expiration of a timer. After cancellation of payment through the FTS 630, the user can return to the merchant web site 720 to select another payment method.

Where the user does authorize payment in step 1224, a digital IOU is presented in a secure channel to the merchant in step 1232. The digital IOU includes a number to uniquely identify the transaction to the merchant, authorization status and a fraud scoring for the transaction. The included number could be a tracking number supplied by the merchant. Some embodiments could provide the digital IOU without any communication to the merchant. For example, the merchant presumes a digital IOU if a cancellation is not sent to the merchant within an hour, or some other period, after beginning the authorization process.

The merchant can fulfill the order in part or in whole. For example, once a shirt from an order for many items is shipped, authorization for the cost of the shirt and a portion of the shipping can be added to an authorization file in step 1236. By authorizing part of the digital IOU, a portion of the payment promised can be redeemed. Later, remaining portions of the payment can be secured as the goods and/or services are realized. The authorization file can be sent to the FTS 630 after each authorization or a number of authorizations can be added to the authorization file and sent periodically in a batch mode shown in step 1240. The authorization file is specific to the merchant in this embodiment, but can have authorizations from any number of users.

Once the authorization files are received, the FTS requests funds transfer through the ACH network 605. For a given merchant, authorizations from past authorization files are clearing as those transfers clear. Clearing time can vary for each transaction. To determine the transactions that have cleared, the merchant 620 may request a settlement file with information gathered from the FTS database 808 for all the outstanding transfers for that merchant. To determine which transfers are still pending, an aggregate of the settlement files can be compared with the clearing file in step 1248. Where the merchant does not have a guarantee from the FTS for payment before the transaction is cleared, the non-sufficient funds (NSF) and other errors are handled in step 1252.

In some embodiments, the FTS 630 may guarantee some transactions such that payment to the merchant is received upon acceptance by the FTS 630. The settlement file in step 1244 would immediately show that the transfer cleared as every digital IOU is honored without question. Where the FTS 630 guarantees payment, there is no need for the merchant 620 to handle non-payment. In some cases, the FTS 630 may selectively guarantee some transactions based upon a scoring of the risk of the transfer being unsuccessful. The guarantee status could be recorded in the settlement file for each transaction.

Figure 13:
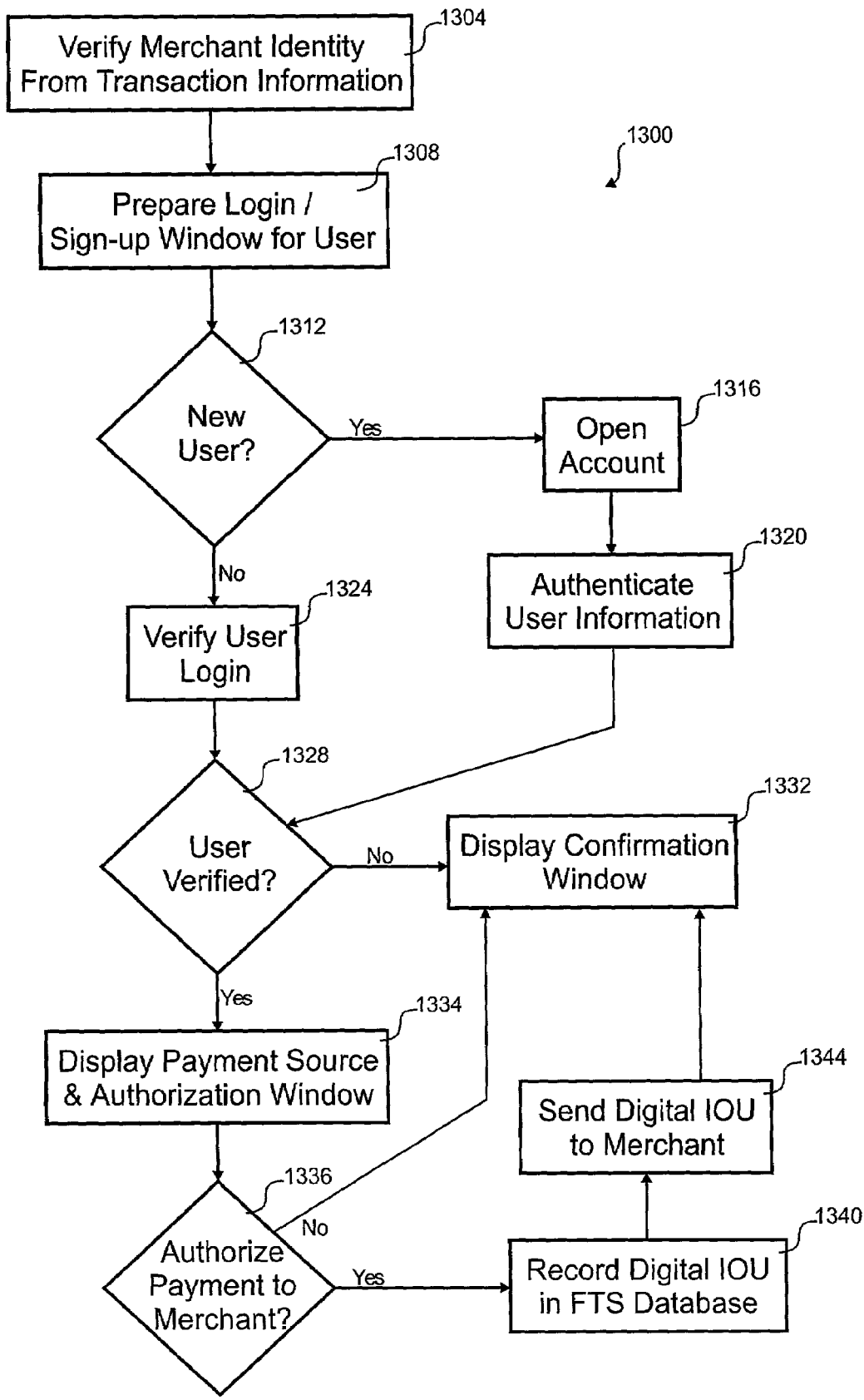
FIG. 13 is a flow diagram of an embodiment of the process for authorizing the payment from a perspective of a funds transfer server.

Referring next to FIG. 13, a flow diagram of an embodiment of a process 1300 for authorizing the payment from a perspective of the FTS 630 is shown. The depicted portion of the process 1300 starts in step 1304 where the identity of the merchant is authenticated using a digital signature included in the transaction information or other technique. The transaction information is used to personalize a checkout window 908 that is presented in step 1308.

In step 1312, new users are separated from existing users. New users open an account in step 1316. The FTS 630 authenticates the user supplied information against databases and any information provided by the merchant before scoring the fraud risk for the new user. Where the user already has an account, processing goes from step 1312 to step 1324 where the user logs into the FTS 630.

A verification of the identity of the user is performed in step 1328. Where identity cannot be verified because either the fraud score is unacceptably low or password is incorrect, a confirmation window is presented to make the user aware of the problem. In some cases, the user is allowed to remedy certain failures in verification, which are described in the confirmation window. For example, the password can be re-entered so long as no more than three failures is seen per day. Where the user is satisfactorily verified in step 1328, a further authorization window is displayed in step 1334 to allow selecting the source of the transfer and to authorize that transfer.

A determination is made in step 1336 as to whether the transfer to the merchant was authorized by the user. If the user cancels the transfer, processing continues to step 1332 where a confirmation window is presented to allow the user to reconsider their choice or return to the merchant site to select a payment source other than the FTS 630. Where the payment is authorized in step 1336, the digital IOU is recorded in the FTS in step 1340 and reported to the merchant in step 1344. The digital IOU, among other things, indicates the purchase was authorized by the user.

Figure 14:
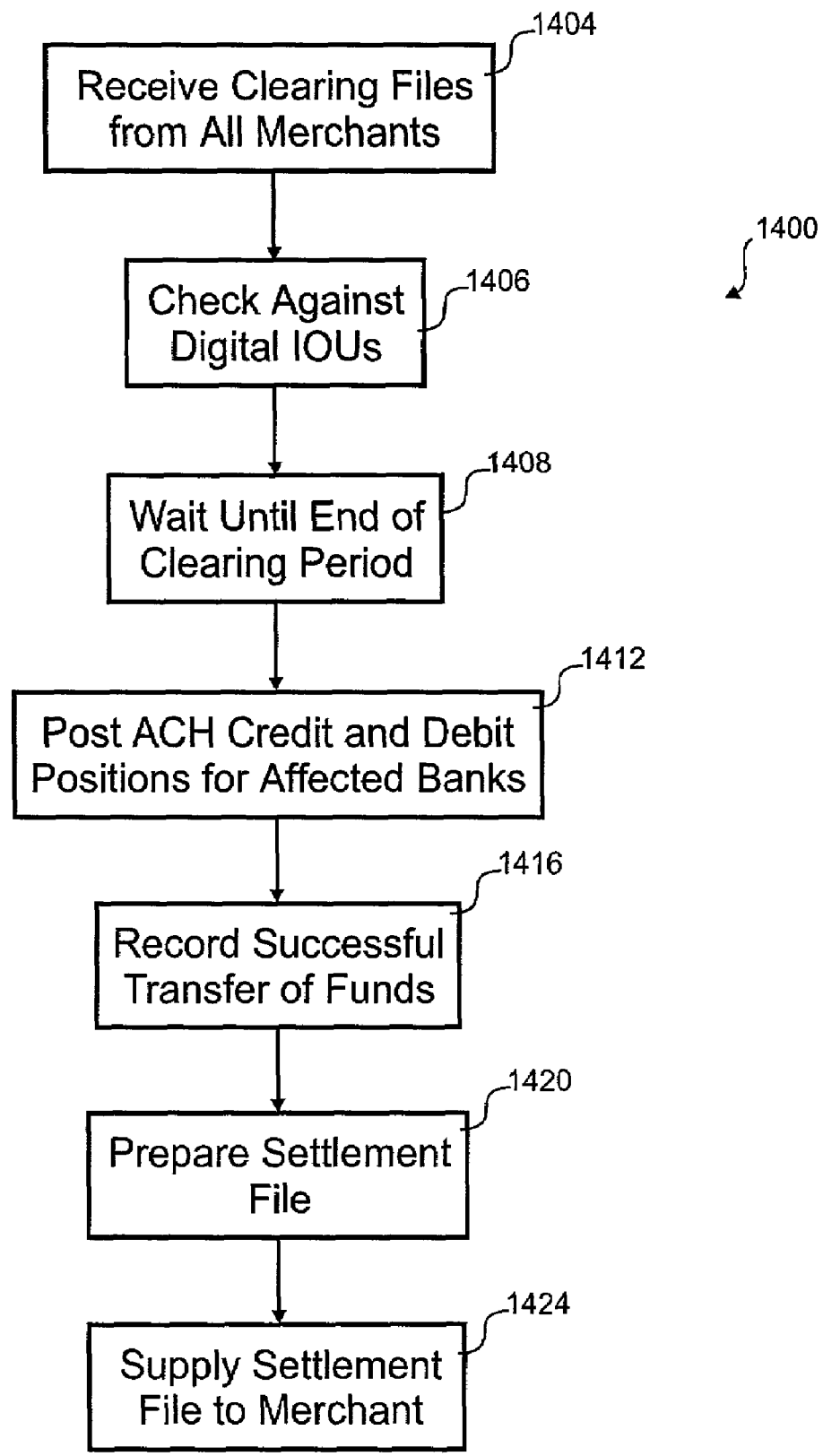
FIG. 14 is a flow diagram of an embodiment of a process for clearing the payment from the perspective of the funds transfer server.

With reference to FIG. 14, a flow diagram of an embodiment of a process 1400 for clearing the payment from the perspective of the FTS 630 is shown. The depicted portion of the process starts in step 1404 where clearing files are received from the various merchants who have authorized digital IOUs with the FTS 630. Each of the clearing files may have one or more authorizations in the file. In step 1406, the authorizations received are checked against the digital IOUs stored in the FTS database where the amount of the digital IOU is reduced or eliminated for partial or full authorizations. Any authorizations that exceed the digital IOU are rejected with an error message sent to the merchant.

This embodiment of the FTS 630 periodically interfaces with the ACH 605 to submit transfers. For example, some embodiments could submit transfers twice a day. The FTS 630 processes the checked authorizations and posts ACH credit and debit positions in the ACH network 605 of the originating banks in step 1412. Each transfer from user to merchant is fulfilled by the ACH network 605 as two separate transfers. An amount of the first transfer may be more than an amount of the second transfer where the difference is accounted for with a fee charged by the FTS 630. This fee may differ based upon, among other things, whether the merchant or the FTS 630 assumes the risk that the first transfer will not clear.

The first transfer is between the user account 640 and the FTS account 660 and the second transfer is between the FTS account 660 and the merchant account 650. Where the FTS 630 guarantees the transaction, these two transfers occur substantially simultaneously as part of the same interaction session with the ACH network 605. In this embodiment, the second transfer is issued before the first transfer clears. In another embodiment where the merchant assumes the risk of non-payment, the second transfer is performed after clearing of the first. In this embodiment 1400, the first and second transfers could be issued simultaneously.

Over time, the ACH network 605 reports transfers that clear and errors for those that don't. The FTS database 808 is updated to reflect the clearing status and errors in step 1416. The merchant system 620 requests a settlement file that is prepared in step 1420. The settlement file includes information on all authorized, but uncleared, transfers for the requesting merchant. That settlement file is supplied to the merchant in step 1424.

Figure 15:
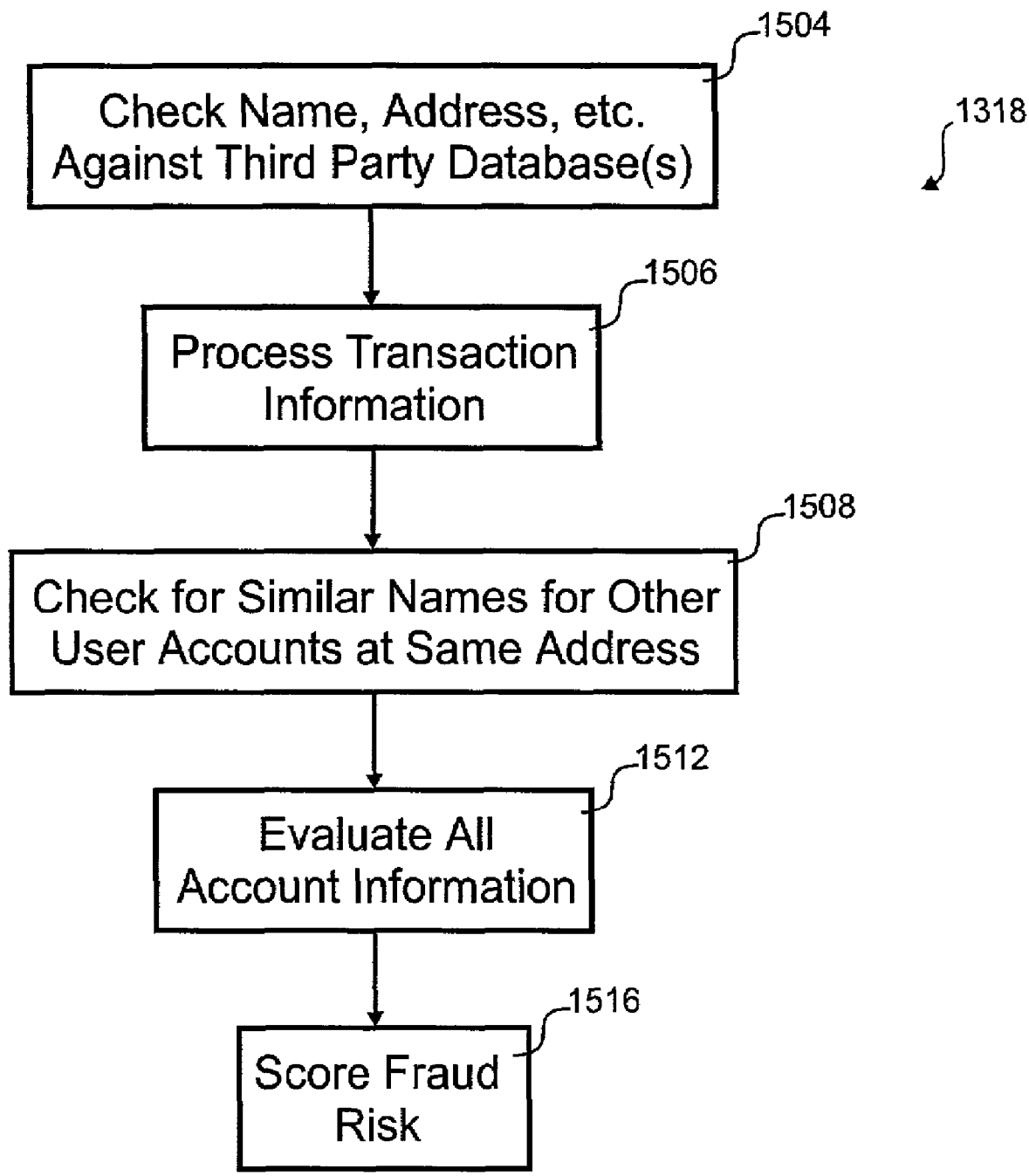
FIG. 15 is a flow diagram of an embodiment of a process for authenticating user information.

Referring next to FIG. 15, a flow diagram of an embodiment of a process 1320 for authenticating user information is shown. Information from users and merchants can potentially be fraudulent or have mistakes. The reliability of the information and the credit worthiness of the FTS accountholder influences their fraud risk score such that the cost of that risk can be passed on to the merchant. During the sign-up process, a name, an address, account numbers and other information is provided to the FTS 630. In step 1504, this supplied information is provided. Any user information provided by a merchant during a authorization process, is checked against this pre-gather information is used to assess the risk of a particular transaction or modify the cumulative fraud risk score. The usage habits of the user may also be monitored to further modify the score risk in step 1506.

In step 1508, a check is made for each user to determine if multiple accounts are opened with the FTS 630. The user may be asked to reconcile the accounts under some circumstances. In step 1512, the account information with any corrections from the account holder is evaluated against other information gathered in the investigation. In step 1516, the fraud risk is scored. Certain scores that don't satisfy a threshold will result in denial of an account. Other risk scores just affect the cost to the merchant to for guaranteeing a particular transaction.

A number of variations and modifications of the invention can also be used. For example, the funds transfer server in any of the above embodiments may transfer funds in the form of other currency or "quasi-currency", such as gift certificates, store credits, airline mileage, promotional points, foreign funds or other currencies. In addition, although the present invention is useful for transactions with bank accounts, it should be apparent from the description herein that the parties may additionally use credit or debit card accounts, promotional points, agent locations, or gift certificates as a source or destination of funds without departing from the scope of the invention.

It will be apparent to those skilled in the art that various modifications and variations can be made in the method and system of the present invention without departing from the spirit or scope of the invention. Thus, it is intended that the present invention include modifications and variations that are within the scope of the appended claims and their equivalents.

What is claimed is:

1. A method for transferring funds between a payor and a payee in an online transaction, the method comprising:

receiving information from the payor at a funds transfer server via a network for debiting a bank account associated with the payor, wherein said information comprises payor personal information including information regarding said bank account associated with the payor and information regarding online transaction data including a total amount for the online transaction;

transmitting to the payee from said funds transfer server via a network authorization to request debits from the payor, wherein a total of all debit requests does not exceed an said total amount for the online transaction;

receiving a first request at said funds transfer server from the payee to debit the payor a first portion of the amount;

initiating a first debit via said funds transfer server from the bank account for the first portion of the amount;

receiving a second request at said funds transfer server from the payee to debit the payor a second portion of the amount; and initiating a second debit via said funds transfer server from the bank account for the second portion of the amount;

wherein said payee does not have access to said payor personal information via said funds transfer server.

2. The method for transferring funds between the payor and the payee in the online transaction as recited in claim 1, further comprising: checking that a sum of the first debit and the second debit does not exceed the total amount before performing the second-listed initiating step.

3. The method for transferring funds between the payor and the payee in the online transaction as recited in claim 1, wherein the first-listed receiving step comprises:

storing information on a plurality of accounts associated with the payor; and receiving selection of the bank account from the plurality of accounts.

4. The method for transferring funds between the payor and the payee in the online transaction as recited in claim 1, further comprising:

receiving information from the payee at said funds transfer server via a network for crediting a bank account associated with the payee, wherein said information comprises payee personal information including information regarding a payee account;

initiating a first credit via said funds transfer server to a payee account that corresponds to the first portion of the amount; and initiating a second credit via said funds transfer server to a payee account that corresponds to the second portion of the amount;

wherein said payor does not have access to said payee personal information via said funds transfer server.

5. The method for transferring funds between the payor and the payee in the online transaction as recited in claim 4, wherein at least one of the following is true:

the first credit is less than the first debit, and the second credit is less than the second debit.

6. The method for transferring funds between the payor and the payee in the online transaction as recited in claim 1, further comprising: receiving information at said funds transfer server from the payee for crediting a payee account.

7. The method for transferring funds between the payor and the payee in the online transaction as recited in claim 1, further comprising: receiving at said funds transfer server an indication from the payor of which of a plurality of accounts to use as the bank account for the online transaction.

8. A computer-readable medium having computer-executable instructions for performing the computer-implementable method for transferring funds between the payor and the payee in the online transaction of claim 1.

9. A method for transferring funds between a first party and a second party in an online transaction, the method comprising:

receiving information from the first party at a funds transfer server via a network for debiting an account associated with the first party, wherein said information comprises personal information including information regarding said account associated with the first party and information regarding online transaction data including a total amount for the online transaction, whereby a total of all debit requests do not exceed said total amount for the online transaction;

transmitting to the second party from said funds transfer server via a network authorization to request debits of the account, whereby the total authorized does not exceed the amount;

receiving a plurality of request from the second party at said funds transfer server to debit the account;

checking at said funds transfer server that the total does not exceed the amount; and initiating a plurality of debits from the account via said funds transfer server using the automated clearinghouse (ACH) network;

wherein the second party does not have access to said personal information from the first party via said funds transfer server.

10. The method for transferring funds between the first party and the second party in the online transaction as recited in claim 9, further comprising: checking that a sum of the plurality of debits does not exceed the total amount before performing the initiating step.

11. The method for transferring funds between the first party and the second party in the online transaction as recited in claim 9, further comprising:

receiving information from the second party at said funds transfer server via a network for crediting a second account of the second party, wherein said information comprises personal information associated with the second party including information regarding said second account; and initiating a plurality of credits to the second account of the second party, wherein the plurality of credits correspond to the plurality of debits.

12. The method for transferring funds between the first party and the second party in the online transaction as recited in claim 11, wherein each of the plurality of credits is less than its corresponding debit by a fee.

13. The method for transferring funds between the first party and the second party in the online transaction as recited in claim 9, further comprising: receiving information from the second party for crediting a second account of the second party.

14. A computer-readable medium having computer-executable instructions for performing the computer-implementable method for transferring funds between the first party and the second party in the online transaction of claim 9.

15. A method for transferring funds between a customer and a merchant with a funds transfer system, the method comprising steps of:

receiving authorization to request debits of a bank account of the customer by the merchant via a funds transfer system, wherein:

a total of all debit requests does not exceed an amount, and the authorization resulted from interaction between the customer and the funds transfer system and said interaction comprises receiving personal information from the customer at said funds transfer system including information regarding said bank account of the customer; sending a plurality of request via a network from the merchant to the funds transfer system to debit the bank account; and receiving from the automated clearinghouse (ACH) network a plurality of credits corresponding to the plurality of requests;

wherein the merchant does not have access to said personal information from the customer via said funds transfer system.

16. The method for transferring funds between the customer and the merchant with the funds transfer system as recited in claim 15, further comprising: checking that a sum of the plurality of requests does not exceed the amount before receiving any credit from the ACH network.

17. The method for transferring funds between the customer and the merchant with the funds transfer system as recited in claim 15, further comprising: initiating a plurality of credits to an account of the merchant.

18. The method for transferring funds between the customer and the merchant with the funds transfer system as recited in claim 17, wherein each of the plurality of credits is less than a plurality of debits from the bank account by a fee.

19. The method for transferring funds between the customer and the merchant with the funds transfer system as recited in claim 15, further comprising: information from the merchant at said funds transfer system for crediting an account of the merchant.

20. A computer-readable medium having computer-executable instructions for performing the computer-implementable method for transferring funds between the customer and the merchant with the funds transfer system of claim 15.

* * * * *

UNITED STATES PATENT AND TRADEMARK OFFICE
CERTIFICATE OF CORRECTION

PATENT NO.        : 7,184,980 B2
APPLICATION NO.   : 09/991364
DATED             : February 27, 2007
INVENTOR(S)       : Terry Allen Rouman et al.

It is certified that error appears in the above-identified patent and that said Letters Patent is hereby corrected as shown below:

In Column 22, Claim 19, line 38, insert --receiving-- after the semicolon in the line.

Signed and Sealed this

First Day of May, 2007

JON W. DUDAS
*Director of the United States Patent and Trademark Office*